United States Patent
Seo et al.

(10) Patent No.: US 12,314,080 B2
(45) Date of Patent: May 27, 2025

(54) ELECTRONIC DEVICE COMPRISING SUPPORT MEMBER

(71) Applicant: Samsung Electronics Co., Ltd., Suwon-si (KR)

(72) Inventors: Jooho Seo, Suwon-si (KR); Jaehyuk Lee, Suwon-si (KR); Donghun Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 122 days.

(21) Appl. No.: 18/138,019

(22) Filed: Apr. 21, 2023

(65) Prior Publication Data
US 2023/0259162 A1 Aug. 17, 2023

Related U.S. Application Data

(63) Continuation of application No. PCT/KR2021/012002, filed on Sep. 6, 2021.

(30) Foreign Application Priority Data

Oct. 22, 2020 (KR) .................. 10-2020-0137484

(51) Int. Cl.
G06F 1/16 (2006.01)
(52) U.S. Cl.
CPC .......... *G06F 1/1624* (2013.01); *G06F 1/1652* (2013.01)
(58) Field of Classification Search
CPC .... G06F 1/1624; G06F 1/1652; G06F 1/1637; G06F 1/1628; G06F 1/165;
(Continued)

(56) References Cited

U.S. PATENT DOCUMENTS 9,823,697 B2 * 11/2017 Hsu ................. G06F 1/1624
10,111,346 B2 * 10/2018 Seo ................. H05K 1/189
(Continued)

FOREIGN PATENT DOCUMENTS

CN 110336903 A 10/2019
EP 3531230 A2 8/2019
(Continued)

OTHER PUBLICATIONS

Extended European Search Report corresponding to Application No. 21883006.5; Dated Feb. 19, 2024.
(Continued)

*Primary Examiner* — Rockshana D Chowdhury
(74) *Attorney, Agent, or Firm* — CANTOR COLBURN LLP

(57) ABSTRACT

An electronic device can include a first housing, a second housing accommodating a portion of the first housing and including a guide groove formed in a first edge thereof, a flexible display including a first display area arranged on the first housing, and a second display area extending from the first display area. The second display area is configured so as to move on the basis of the sliding movement of the first housing in a first direction; and a support member including a fixed portion arranged below the first display area, a moving portion arranged below the second display area, and a protrusion extending from the moving portion and inserted in the guide groove. The protrusion may include a first area protruding in a second direction perpendicular to the first direction and a second area extending from the first area in a third direction different from the second direction.

16 Claims, 21 Drawing Sheets

(58) Field of Classification Search
CPC ...... G06F 2203/04102; H04M 1/0268; H04M 1/0237; G09F 9/301
See application file for complete search history.

(56) References Cited

U.S. PATENT DOCUMENTS

| | | | | |
|---|---|---|---|---|
| 10,194,543 | B2* | 1/2019 | Seo | G09F 9/301 |
| 10,203,531 | B2* | 2/2019 | Choi | H10K 50/131 |
| 10,887,438 | B2* | 1/2021 | Baek | G06F 3/0412 |
| 11,051,413 | B2* | 6/2021 | Yang | G06F 1/1624 |
| 11,165,897 | B2* | 11/2021 | Song | H04M 1/0237 |
| 11,194,363 | B2* | 12/2021 | Kim | G06F 1/1637 |
| 11,252,826 | B2* | 2/2022 | Park | H04M 1/0268 |
| 11,592,867 | B2* | 2/2023 | Liu | G06F 1/1624 |
| 11,602,058 | B2* | 3/2023 | Kim | H05K 5/0017 |
| 11,665,839 | B2* | 5/2023 | Zeng | G06F 1/1652 |
| | | | | 361/807 |
| 11,689,651 | B2* | 6/2023 | Feng | H04M 1/0237 |
| | | | | 455/566 |
| 11,758,668 | B2* | 9/2023 | Liu | H05K 5/0217 |
| | | | | 361/807 |
| 11,778,080 | B2* | 10/2023 | Liu | G06F 1/1677 |
| | | | | 361/679.56 |
| 11,797,050 | B2* | 10/2023 | Lim | G06F 1/1624 |
| 11,800,657 | B2* | 10/2023 | Jiang | G09F 9/301 |
| 2012/0305202 | A1 | 12/2012 | Ganz | |
| 2014/0166992 | A1 | 6/2014 | Hack et al. | |
| 2018/0103552 | A1 | 4/2018 | Seo et al. | |
| 2018/0190936 | A1 | 7/2018 | Lee et al. | |
| 2019/0146558 | A1* | 5/2019 | Ohata | G06F 3/147 |
| | | | | 361/679.21 |
| 2019/0243424 | A1 | 8/2019 | Lee et al. | |
| 2019/0261519 | A1 | 8/2019 | Park et al. | |
| 2019/0268455 | A1 | 8/2019 | Baek et al. | |
| 2019/0373151 | A1* | 12/2019 | Jia | H04M 1/0264 |
| 2020/0120814 | A1 | 4/2020 | Huang | |
| 2020/0201394 | A1* | 6/2020 | Choi | H05K 5/0017 |
| 2020/0249722 | A1 | 8/2020 | Cha | |
| 2020/0253063 | A1 | 8/2020 | Jiang | |
| 2021/0191558 | A1 | 6/2021 | Jung et al. | |
| 2022/0155823 | A1 | 5/2022 | Shin et al. | |

FOREIGN PATENT DOCUMENTS

| | | |
|---|---|---|
| KR | 20140079710 A | 6/2014 |
| KR | 20180040181 A | 4/2018 |
| KR | 20190096026 A | 8/2019 |
| KR | 20190101184 A | 8/2019 |
| KR | 20190101605 A | 9/2019 |
| KR | 20190128843 A | 11/2019 |
| KR | 20200095307 A | 8/2020 |
| WO | 2020209425 A1 | 10/2020 |

OTHER PUBLICATIONS

International Search Report and Written Opinion for International Application No. PCT/KR2021/012002; International Filing Date Sep. 6, 2021; Date of Mailing Dec. 1, 2021; 9 Pages.
Korean Examination Report corresponding to Application No. 10-2020-0137484; Dated Jan. 17, 2025.

* cited by examiner

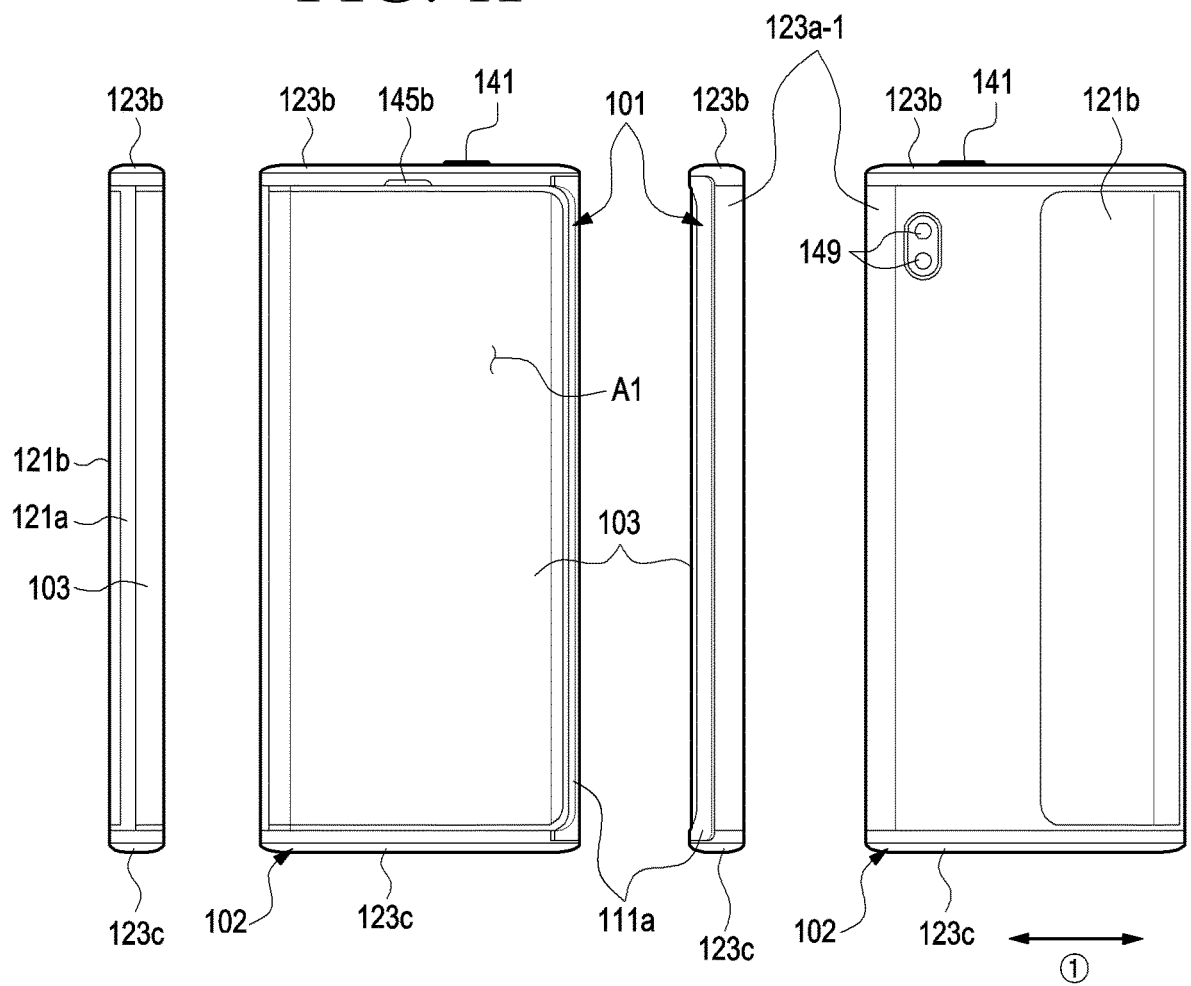

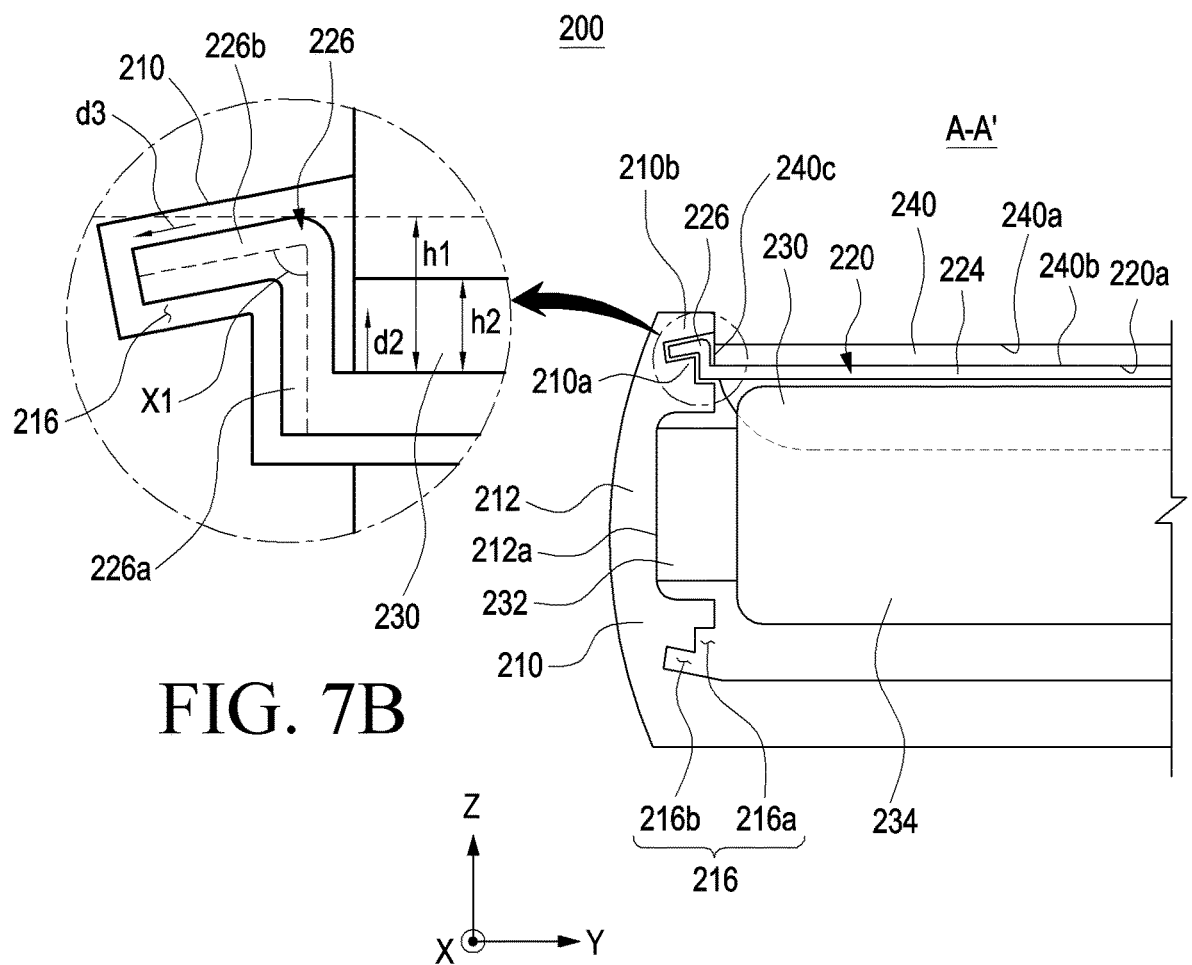

ELECTRONIC DEVICE COMPRISING SUPPORT MEMBER

CROSS-REFERENCE TO RELATED APPLICATION

This application is a continuation of International Application No. PCT/KR2021/012002, designating the United States, filed on Sep. 6, 2021, in the Korean Intellectual Property Receiving Office and claiming priority to Korean Patent Application No. 10-2020-0137484, filed on Oct. 22, 2020, in the Korean Intellectual Property Office, the disclosures of which are incorporated by reference herein in their entireties.

TECHNICAL FIELD

Various embodiments of the disclosure relate to an electronic device including a display assembly and a support member.

BACKGROUND ART

Due to the development of information and communication technology and semiconductor technology, various functions are being integrated into a single portable electronic device. For example, an electronic device may implement various functions, such as an entertainment function (e.g., a game function), a multimedia function (e.g., a music/video replay function), a communication and security function for mobile banking or the like, a schedule management function, and an e-wallet function, in addition to a communication function. Such an electronic device is being miniaturized so as to be conveniently carried by a user.

DETAILED DESCRIPTION OF THE INVENTION

Technical Problem

As a mobile communication service is extended to the multimedia service area, it is necessary to increase the size of a display of an electronic device in order to allow a user to fully utilize a multimedia service as well as a voice call or short message service. However, the size of the display of the electronic device is in a trade-off relationship with the miniaturization of the electronic device.

An electronic device (e.g., a portable terminal) includes a display having a flat surface or a display having a flat surface and a curved surface. An electronic device including a display may have a limitation in implementing a screen larger than the size of the electronic device due to a fixed display structure. Accordingly, an electronic device including a foldable or rollable display is being researched.

In implementing a rollable electronic device, it may be difficult to ensure mechanical stability while allowing the housings of the electronic device to move (e.g., slide) relative to each other. For example, it may be difficult to ensure a stable operating structure in a rollable electronic device while ensuring portability of the electronic device through miniaturization. In addition, since the display is exposed to the outside of the electronic device in a side surface portion thereof, the display may be relatively vulnerable to external impact.

Technical Solution

According to various embodiments of the disclosure, an electronic device may include a first housing, a second housing configured to accommodate at least a portion of the first housing and including a guide groove provided at a first edge, a flexible display including a first display area disposed on the first housing and a second display area extending from the first display area, wherein the second display area is configured to move based on sliding of the first housing in a first direction, and a support member including a fixed portion disposed under the first display area, a moving portion disposed under the second display area, and at least one protrusion extending from the moving portion, the at least one protrusion insertable into the guide groove such that the support member slides relative to the second housing along the guide groove. The protrusion may include a first area protruding in a second direction perpendicular to the first direction and a second area extending from the first area in a third direction different from the second direction.

According to various embodiments of the disclosure, a display assembly may include a flexible display including a first display area and a second display area extending from the first display area in a first direction, and a support member including a fixed portion disposed under the first display area, a moving portion disposed under the second display area and integrally configured with the fixed portion, and at least one protrusion extending from the moving portion. The moving portion may include at least one first through-pattern. At least a portion of the at least one first through-pattern is provided at a border of the moving portion, and the protrusion may include a first area extending in a second direction perpendicular to the first direction and a second area extending from the first area in a third direction different from the second direction.

According to various embodiments of the disclosure, it is possible to provide an electronic device including a support member that protects a display while stably implementing a display rolling operation.

According to various embodiments of the disclosure, it is possible to provide an electronic device including a support member capable of preventing mechanical separation of a display from a housing and increasing a mounting space.

According to various embodiments of the disclosure, it is possible to provide an electronic device including a support member configured to increase convenience in manufacturing and assembling processes.

However, the problems to be solved in the disclosure are not limited to the above-mentioned problems, and may be variously expanded without departing from the spirit and scope of the disclosure.

Advantageous Effects

An electronic device according to various embodiments of the disclosure may protect a display by using a support member surrounding at least a portion of the side surface of the display.

The support member according to various embodiments of the disclosure may include a protrusion that slides along the guide groove in the housing. Since the support member is inserted into the housing, a separate guide rail is not required, and thus an inner mounting space may be increased.

Since the support member of the electronic device according to various embodiments of the disclosure is integrally configured, an operation of aligning the multi-bars parallel to each other is not required, thereby increasing convenience in manufacturing and assembling processes.

BRIEF DESCRIPTION OF DRAWINGS

FIG. 1A is a front side view illustrating a state in which a second display area of a flexible display according to various embodiments of the disclosure is accommodated in a second housing.

FIG. 1B is a back side view illustrating a state in which a second display area of a flexible display according to various embodiments of the disclosure is accommodated in a second housing.

FIG. 1C is a bottom side view illustrating a state in which a second display area of a flexible display according to various embodiments of the disclosure is accommodated in a second housing.

FIG. 1D is a left side view illustrating a state in which a second display area of a flexible display according to various embodiments of the disclosure is accommodated in a second housing.

FIG. 1E is a right side view illustrating a state in which a second display area of a flexible display according to various embodiments of the disclosure is accommodated in a second housing.

FIG. 1F is a top side view illustrating a state in which a second display area of a flexible display according to various embodiments of the disclosure is accommodated in a second housing.

FIG. 7A is a cross-sectional view of the electronic device of FIG. 4.

FIG. 7B is a detailed view of a portion of FIG. 7A.

MODE FOR CARRYING OUT THE INVENTION

Figures 2A, 2B, 2C, 2D:
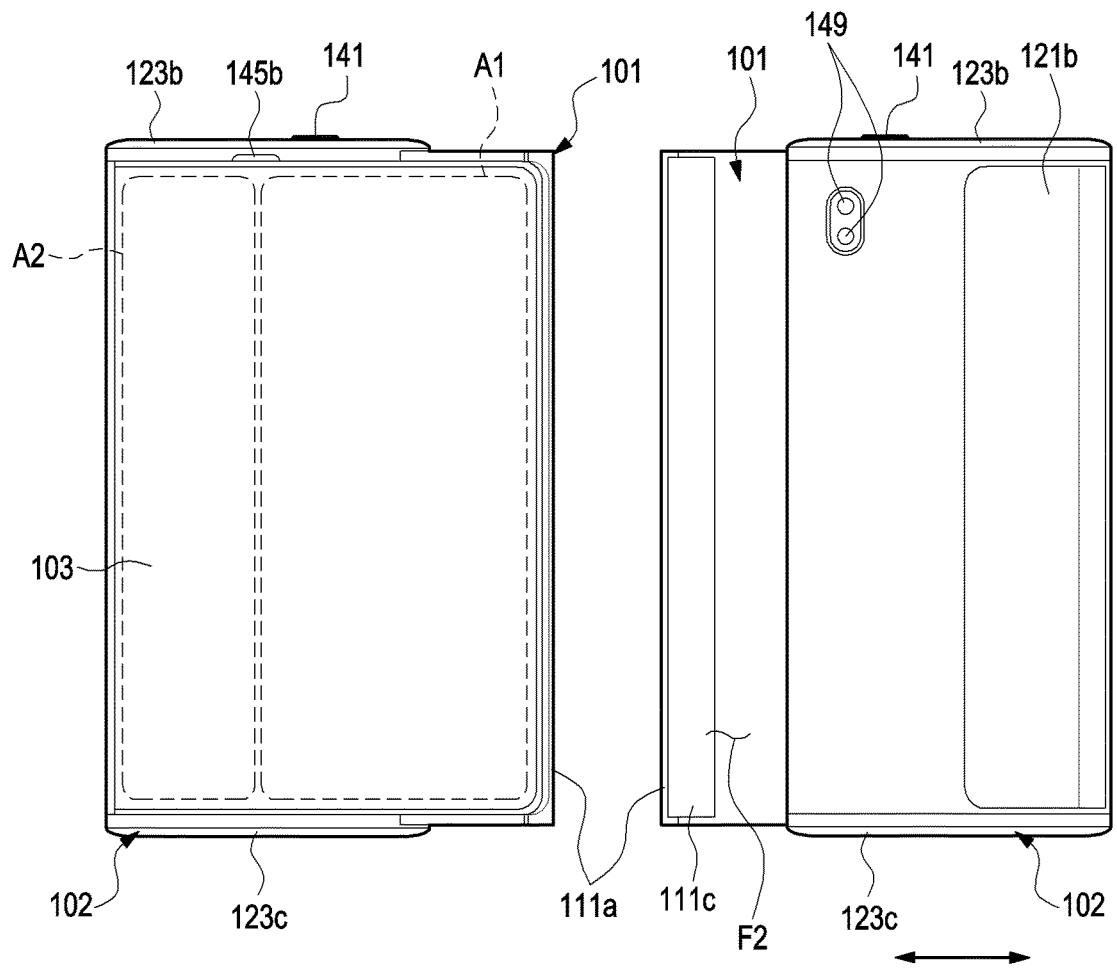
FIG. 2A is a front side view illustrating a state in which the second display area of the flexible display according to various embodiments of the disclosure is exposed to the outside of the second housing.
FIG. 2B is a back side view illustrating a state in which the second display area of the flexible display according to various embodiments of the disclosure is exposed to the outside of the second housing.
FIG. 2C is a bottom side view illustrating a state in which the second display area of the flexible display according to various embodiments of the disclosure is exposed to the outside of the second housing.
FIG. 2D is a top side view illustrating a state in which the second display area of the flexible display according to various embodiments of the disclosure is exposed to the outside of the second housing.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1A is a front side view illustrating a state in which a second display area of a flexible display according to various embodiments of the disclosure is accommodated in a second housing. FIG. 1B is a back side view illustrating a state in which a second display area of a flexible display according to various embodiments of the disclosure is accommodated in a second housing. FIG. 1C is a bottom side view illustrating a state in which a second display area of a flexible display according to various embodiments of the disclosure is accommodated in a second housing. FIG. 1D is a left side view illustrating a state in which a second display area of a flexible display according to various embodiments of the disclosure is accommodated in a second housing. FIG. 1E is a right side view illustrating a state in which a second display area of a flexible display according to various embodiments of the disclosure is accommodated in a second housing. FIG. 1F is a top side view illustrating a state in which a second display area of a flexible display according to various embodiments of the disclosure is accommodated in a second housing.

FIG. 2A is a front side view illustrating a state in which the second display area of the flexible display according to various embodiments of the disclosure is exposed to the outside of the second housing. FIG. 2B is a back side view illustrating a state in which the second display area of the flexible display according to various embodiments of the disclosure is exposed to the outside of the second housing. FIG. 2C is a bottom side view illustrating a state in which the second display area of the flexible display according to various embodiments of the disclosure is exposed to the outside of the second housing. FIG. 2D is a top side view illustrating a state in which the second display area of the flexible display according to various embodiments of the disclosure is exposed to the outside of the second housing.

The state illustrated in FIGS. 1A-1F may be defined as the state in which the first housing 101 is closed relative to the second housing 102, and the state illustrated in FIGS. 2A-2D may be defined as the state in which the first housing 101 is opened relative to the second housing 102. According to an embodiment, the "closed state" or the "opened state" may be defined as the state in which the electronic device is closed or the state in which the electronic device is opened.

Referring to FIGS. 1A-1F and 2A-2D, the electronic device 100 may include a second housing 102 and a first housing 101 that is disposed to be movable relative to the second housing 102. In some embodiments, the electronic device 100 may be interpreted as a structure in which the second housing 102 is disposed to be slidable on the first housing 101. According to an embodiment, the first housing 101 may be disposed to be reciprocable by a predetermined distance in the illustrated direction (e.g., the direction indicated by arrow) relative to the second housing 102.

According to various embodiments, the first housing 101 may be referred to as, for example, a first structure, a slide unit, or a slide housing, and may be disposed to be reciprocable on the second housing 102. According to an embodiment, the second housing 102 may be referred to as, for example, a second structure, a main unit, or a main housing, and may accommodate various electrical and electronic components such as a main circuit board and a battery. A portion of the display 103 (e.g., a first display area A1) may be seated on the first housing 101. According to an embodiment, when the first housing 101 moves (e.g., slides) relative to the second housing 102, another portion of the display 103 (e.g., a second display area A2) may be accommodated inside the second housing 102 (e.g., a slide-in operation) or exposed to the outside of the second housing 102 (e.g., a slide-out operation).

According to various embodiments, the first housing 101 may include a first plate 111a (e.g., a slide plate). The first plate 111a may include a first surface (e.g., the first surface F1 in FIG. 3) configuring at least a portion thereof and a second surface F2 facing an opposite direction to the first surface F1.

According to various embodiments, the second housing 102 may include a rear surface case (e.g., the rear surface case 121a in FIG. 3), a first side wall 123a extending from the rear surface case 121a, a second side wall 123b extending from the first side wall 123a and the rear surface case 121a, a third side wall 123c extending from the first side wall 123a and the rear surface case 121a to be parallel to the second side wall 123b, and/or a rear surface plate 121b (e.g., a rear window). According to an embodiment, the second side wall 123b and the third side wall 123c may be perpendicular to the first side wall 123a. According to an embodiment, the rear surface case 121a, the first side wall 123a, the second side wall 123b, and the third side wall 123c may be opened on one side (e.g., the front surface) to accommodate (or surround) at least a portion of the first housing 101. For example, the first housing 101 may be coupled to the second housing 102 in a state of being at least partially surrounded and may slide in a direction parallel to the first surface F1 or the second surface F2 (e.g., the direction indicated by arrow ①) while being guided by the second housing 102.

According to various embodiments, the rear surface case 121a, the first side wall 123a, the second side wall 123b, and/or the third side wall 123c may be configured as separate housings and coupled or assembled. The rear surface plate 121b may cover at least a portion of the rear surface case 121a. According to an embodiment, the rear surface plate 121b may be substantially integrally configured with the rear surface case 121a. According to an embodiment, the rear surface case 121a or the rear surface plate 121b may cover at least a portion of the flexible display 103. For example, at least a portion of the flexible display 103 may be accommodated inside the second housing 102, and the rear surface case 121a or the rear surface plate 121b may at least partially cover the flexible display 103 accommodated inside the second housing 102.

According to various embodiments, the first hosing 101 may be movable in a first direction (e.g., the direction ①)

parallel to the rear surface case 121*a* (e.g., the second plate) and the second side wall 221*b* to the opened state and the closed state relative to the second housing 102, and the first housing 101 may be movable to be located at a first distance from the first side wall 123*a* in the closed state and at a second distance, which is greater than the first distance, from the first side wall 123*a* in the opened state. In some embodiments, in the closed state, the first housing 101 may surround a portion of the first side wall 123*a*.

According to various embodiments, the electronic device 100 may include a display 103, a key input device 141, a connector hole 143, audio modules 145*a*, 145*b*, 147*a*, and 147*b*, or a camera module 149. Although not illustrated, the electronic device 100 may further include an indicator (e.g., an LED device) or various sensor modules.

According to various embodiments, the display 103 may include a first display area A1 and a second display area A2. According to an embodiment, the first display area A1 may be disposed on the first housing 101. For example, the first display area A1 may extend substantially across at least a portion of the first surface F1 and may be disposed on the first surface F1. The second display area A2 may extend from the first display area A1 and may be inserted into or accommodated in the inside of the second housing 102 (e.g., a structure) or may be exposed to the outside of the second housing 102 according to the sliding of the first housing 101.

According to various embodiments, the second display area A2 may be moved while substantially being guided by a roller (e.g., the roller 151 in FIG. 3) mounted in the second housing 102 to be accommodated inside the second housing 102 or exposed to the outside. According to an embodiment, the second display area A2 may be moved based on the sliding of the first housing 101 in the first direction (e.g., the direction indicated by arrow ①). For example, while the first housing 101 slides, a portion of the second display area A2 may be deformed into a curved shape at a position corresponding to the roller 151.

According to various embodiments, when viewed from above the first plate 111*a* (e.g., the slide plate), if the first housing 101 moves from the closed state to the opened state, the second display area A2 may define a substantially flat surface with the first display area A1 while being gradually exposed to the outside of the second housing 102. The display 103 may be coupled to or disposed adjacent to a touch detection circuit, a pressure sensor capable of measuring touch intensity (pressure), and/or a digitizer configured to detect a magnetic field-type stylus pen. In an embodiment, the second display area A2 may be at least partially accommodated inside the second housing 102, and even in the state (e.g., the closed state) illustrated in FIGS. 1A-1F, a portion of the second display area A2 may be exposed to the outside. According to an embodiment, irrespective of the closed state or the opened state, a portion of the exposed second display region A2 may be located on the roller (e.g., the roller 151 in FIG. 3), and at a position corresponding to the roller 151, a portion of the second display region A2 may maintain the curved shape.

According to various embodiments, the key input device 141 may be disposed on the second side wall 123*b* or the third side wall 123*c* of the second housing 102. The electronic device 100 may be designed such that, depending on the exterior and use state, the illustrated key input device 141 are omitted or an additional key input device(s) is(are) included. According to an embodiment, the electronic device 100 may include a key input device (not illustrated), such as a home key button or a touch pad disposed around the home key button. According to another embodiment, at least some of the key input devices 141 may be located in an area of the first housing 101.

According to various embodiments, the connector hole 143 may be omitted in some embodiments, and may accommodate a connector (e.g., a USB connector) for transmitting/receiving power and/or data to/from an external electronic device. Although not illustrated, the electronic device 100 may include a plurality of connector holes 143, and some of the connector holes 143 may function as connector holes for transmitting/receiving audio signals to/from an external electronic device. In the illustrated embodiment, the connector holes 143 are disposed in the third side wall 123*c*, but the disclosure is not limited thereto. The connector holes 143 or a connector hole (not illustrated) may be disposed in the first side wall 123*a* or the second side wall 123*b*.

According to various embodiments, the audio modules 145*a*, 145*b*, 147*a*, and 147*b* may include speaker holes 145*a* and 145*b* or microphone holes 147*a* and 147*b*. One of the speaker holes 145*a* and 145*b* may be provided as a receiver hole for a voice call, and another one may be provided as an external speaker hole. The electronic device 100 may include a microphone configured to acquire sound, and the microphone may acquire sound outside the electronic device 100 through the microphone holes 147*a* and 147*b*. According to an embodiment, the electronic device 100 may include a plurality of microphones in order to detect the direction of sound. According to an embodiment, the speaker holes 145*a* and 145*b* and the microphone holes 147*a* and 147*b* may be implemented as a single hole, or a speaker may be included without the speaker holes 145*a* and 145*b* (e.g., a piezo speaker). According to an embodiment, the speaker hole indicated by reference numeral "145*b*" may be disposed in the first housing 101 to be used as a receiver hole for voice call, and the speaker hole (e.g., the external speaker hole) indicated by reference numeral "145*a*" or the microphone holes 147*a* and 147*b* may be disposed in the second housing 102 (e.g., one of the side surfaces 123*a*, 123*b*, and 123*c*).

According to various embodiments, the camera module 149 may be located in the second housing 102 and may photograph a subject in a direction opposite to the first display area A1 of the display 103. The electronic device 100 may include a plurality of camera modules 149. For example, the electronic device 100 may include at least one of a wide-angle camera, a telephoto camera, and a close-up camera. According to an embodiment, the electronic device 100 may include an infrared projector and/or an infrared receiver to measure the distance to the subject. The camera module 149 may include one or more lenses, an image sensor, and/or an image signal processor. Although not illustrated, the electronic device 100 may further include another camera module (e.g., a front camera) for photographing a subject from a direction opposite to the camera module 149 with respect to the display 103. For example, the front camera may be disposed in an area around the first display area A1 or an area overlapping the display 103, and when disposed in the area overlapping the display 103, the front camera may photograph a subject through the display 103.

According to various embodiments, an indicator (not illustrated) of the electronic device 100 may be disposed on the first housing 101 or the second housing 102, and may include a light-emitting diode to provide state information of the electronic device 100 as a visual signal. A sensor module (not illustrated) of the electronic device 100 may generate an electrical signal or a data value corresponding to an internal operating state of the electronic device 100 or an external environmental state. The sensor module may include, for example, a proximity sensor, a fingerprint sensor, or a biometric sensor (e.g., an iris/face recognition sensor or an HRM sensor). In another embodiment, the sensor module may further include at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 3:
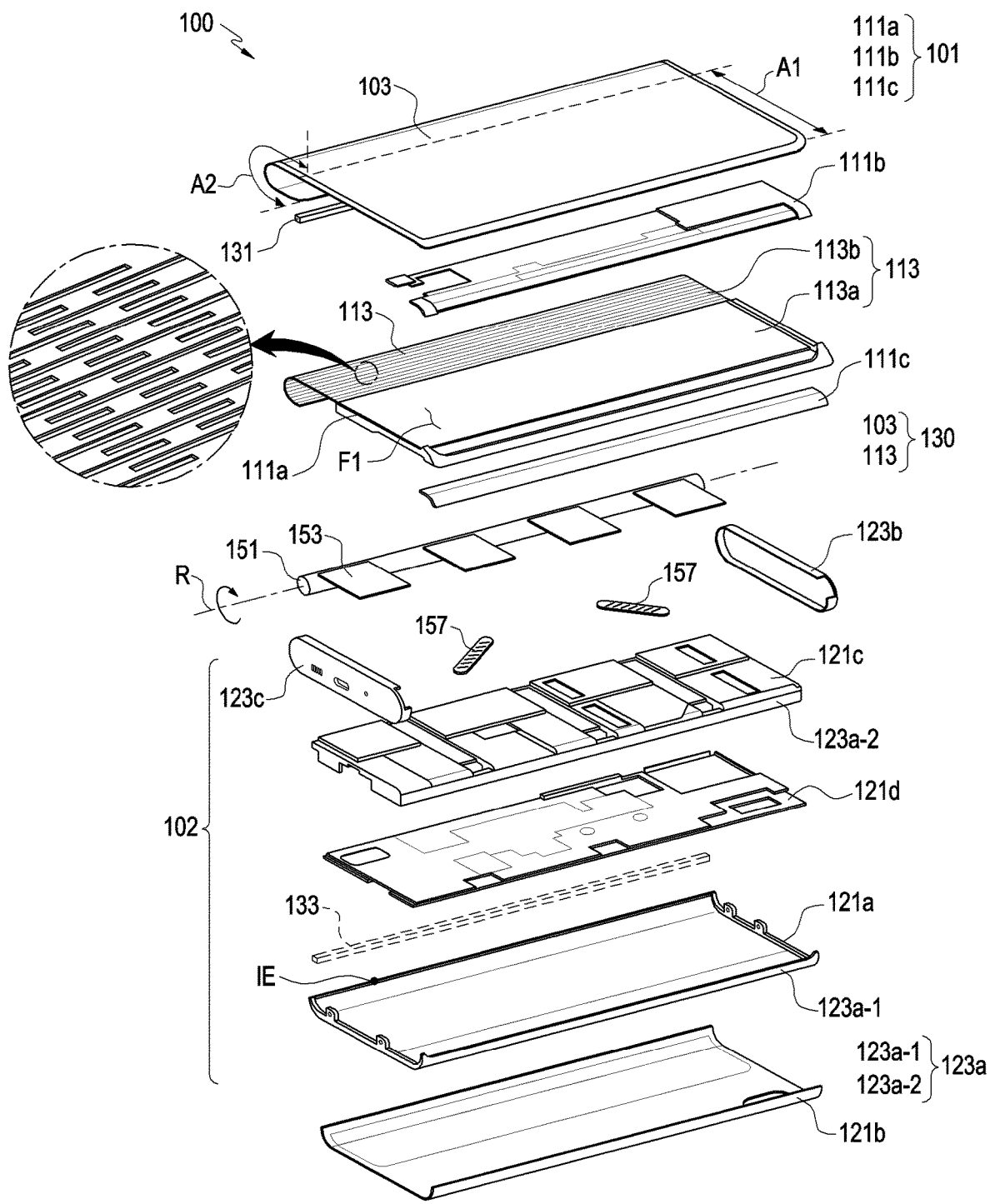
FIG. 3 is an exploded perspective view of an electronic device according to various embodiments of the disclosure.

FIG. 3 is an exploded perspective view of an electronic device according to various embodiments of the disclosure.

Referring to FIG. 3, the electronic device 100 may include a first housing 101, a second housing 102 (e.g., a structure), a display 103 (e.g., a flexible display, a foldable display, or a rollable display), a guide member (e.g., the roller 151), and/or a support member 113. A portion of the display 103 (e.g., the second display area A2) may be accommodated inside the second housing 102 while being guided by the roller 151. The configurations of the first housing 101, the second housing, and the display 103 of FIG. 3 may be wholly or partly the same as those of the first housing 101, the second housing, and the display 103 of FIGS. 1A and 2A.

According to various embodiments, the first housing 101 may include a first plate 111a (e.g., a slide plate), and a first bracket 111b and/or a second bracket 111c mounted on the first plate 111a and/or the support member 113. The first housing 101, for example, the first plate 111a, the first bracket 111b, and/or the second bracket 111c may be made of a metal material and/or a non-metal (e.g., a polymer) material. The first plate 111a may be mounted on the second housing 102 (e.g., a structure) to be linearly reciprocable in one direction (e.g., the direction indicated by arrow ① in FIG. 1B) while being guided by the second housing 102. According to an embodiment, the first bracket 111b may be coupled to the first plate 111a to define the first surface F1 of the first housing 101 together with the first plate 111a. The first display area A1 of the display 103 may be substantially mounted on the first surface F1 to maintain a flat plate shape. According to another embodiment, the support member 113 may be disposed on the first surface F1 of the first plate 111a and/or the first bracket 111b, and the first display area A1 of the display 103 may be mounted on the support member 113. The second bracket 111c may be coupled to the first plate 111a to define the second surface F2 of the first housing 101 together with the first plate 111a. According to an embodiment, the first bracket 111b and/or the second bracket 111c may be configured integrally with the first plate 111a. This may be appropriately designed in consideration of the assembly structure or manufacturing process of a manufactured product. The first housing 101 or the first plate 111a may be coupled to the second housing 102 to be slidable relative to the second housing 102.

According to various embodiments, the support member 113 may be disposed under the display 103 and support the display 103.

According to various embodiments, the support member 113 may be connected to the first housing 101. For example, as the first housing 101 slides, the support member 113 may move relative to the second housing 102, and in the closed state (e.g., the state illustrated in FIGS. 1A-1F), the first housing 101 may be substantially accommodated inside the second housing 102. According to an embodiment, even in the closed state, a portion of the support member 113 may not be accommodated into the second housing 102. For example, even in the closed state, a portion of the support member 113 may be located to correspond to the roller 151 outside the second housing 102. According to an embodiment, the support member 113 may include a plurality of through-patterns, and the through-patterns may extend in a straight line to be parallel to the rotation axis R of the roller 151 and may be arranged in a direction perpendicular to The rotational axis R, for example, along the direction in which the first housing 101 slides.

According to various embodiments, as the first housing 101 slides, the support member 113 may form a curved surface or a flat shape. For example, as the first housing 101 slides, the support member 113 may define a curved surface in a portion facing the roller 151, and the support member 113 may define a flat surface in a portion not facing the roller 151. According to an embodiment, the support member 113 may include a fixed portion 113a disposed under the first display area A1 of the display 103 and supporting the first display area A1, and a moving portion 113b disposed under the second display area A2 and supporting the second display area A2. According to an embodiment, the second display area A2 may be exposed to the outside of the second housing 102 together with the first display area A1 in the opened state (e.g., the state illustrated in FIGS. 2A-2D). In the state in which the second display area A2 is exposed to the outside of the second housing 102, the support member 113 may support or maintain the second display area A2 in the flat state by defining a substantially flat surface.

According to various embodiments, the second housing 102 (e.g., a structure) may include a rear surface case 121a (e.g., the second plate), a printed circuit board (not illustrated), a rear surface plate 121b, a third plate 121c (e.g., a front surface case), and/or a support bracket 121d. The rear surface case 121a (e.g., the rear surface case 121a) may be disposed to face a direction opposite to the first surface F1 of the first plate 111a, and may substantially configure at least a portion of the exterior of the second housing 102 or the electronic device 100. According to an embodiment, the second housing 102 may include a first side wall 123a extending from the rear surface case 121a, a second side wall 123b extending from the rear surface case 121a to be substantially perpendicular to the first side wall 123a, and a third side wall 123c extending from the rear surface case 121a to be substantially perpendicular to the first side wall 123a and parallel to the second side wall 123b. In the illustrated embodiment, a structure in which the second side wall 123b and the third side wall 123c are manufactured as separate components from the rear surface case 121a and mounted or assembled to the rear surface case 121a is exemplified, but the second side wall 123b and the third side wall 123c may be integrally configured with the rear surface case 121a. The second housing 102 may accommodate an antenna for proximity wireless communication, an antenna for wireless charging, or an antenna for magnetic secure transmission (MST) in a space that does not overlap the support member 113.

According to various embodiments, the rear surface plate 121b may be coupled to the outer surface of the rear surface case 121a, and in some embodiments, may be manufactured integrally with the rear surface case 121a. In an embodiment, the rear surface case 121a may be made of a metal or polymer material, and the rear surface plate 121b may be made of metal, glass, synthetic resin, or ceramic material. According to an embodiment, at least a portion of the rear surface case 121a and/or the rear surface plate 121b (e.g., an auxiliary display area) may be made of a light transmissive material. For example, in the state in which a portion of the display 103 (e.g., the second display area A2) is accommodated inside the second housing 102, the electronic device 100 may output visual information by using a partial area of the display 103 accommodated inside the second housing 102. The auxiliary display area may provide the visual information output from the area accommodated inside the second housing 102 to the outside of the second housing 102.

According to various embodiments, the third plate 121c may be coupled to the rear surface case 121a (e.g., the rear case), the first side wall 123a, the second side wall 123b, and/or the third side wall 123c to define an inner space of the second housing 102. In some embodiments, the third plate 121c may be referred to as a "front surface case." For example, the first plate 111a of the first housing 101 may slide while substantially facing the third plate 121c. According to an embodiment, the first side wall 123a may be configured by a combination of a first side wall portion 123a-1 extending from the rear surface case 121a and a second side wall portion 123a-2 provided at one side edge of the third plate 121c. In another embodiment, the first side wall portion 123a-1 may be coupled to cover one side edge of the third plate 121c (e.g., the second side wall portion 123a-2), in which case, the first side wall portion 123a-1 itself may configure the first side wall 123a. According to an embodiment, the third plate 121c may be made of a metal or polymer material.

According to various embodiments, the support bracket 121d may be disposed in the space between the rear surface case 121a and the third plate 121c and may have a flat plate shape made of a metal or polymer material. The support bracket 121d may provide an electromagnetic shielding structure in the inner space of the second housing 102 or may improve mechanical rigidity of the second housing 102. According to an embodiment, when the first housing 101 is accommodated inside the second housing 102, the support member 113 and/or a partial area of the display 103 (e.g., the second display area A2) may be located in the space between the rear surface case 121a and the support bracket 121d.

According to various embodiments, a printed circuit board (not illustrated) may be disposed in the space between the third plate 121c and the support bracket 121d. For example, the printed circuit board may be accommodated in a space separated, by the support bracket 121d, from the space in which the support member 113 and/or a partial area of the display 103 are accommodated inside the second housing 102. On the printed circuit board, a processor, a memory, and/or an interface may be mounted. The processor may include at least one of, for example, a central processing unit, an application processor, a graphics processor, an image signal processor, a sensor hub processor, or a communication processor.

The memory may include, for example, a volatile memory or a nonvolatile memory.

The interface may include, for example, a high-definition multimedia interface (HDMI), a universal serial bus (USB) interface, an SD card interface, and/or an audio interface. The interface may electrically or physically connect, for example, the electronic device 100 to an external electronic device, and may include a USB connector, an SD card/an MMC connector, or an audio connector.

According to various embodiments, the display 103 may be a flexible display based on an organic light-emitting diode and may be at least partially deformed into a curved shape while being generally maintained in a flat shape. In an embodiment, the first display area A1 of the display 103 may be mounted or attached to the first surface F1 of the first housing 101 and/or to the fixed portion 113a of the support member 113, and may be maintained in a substantially flat shape. The second display area A2 may extend from the first display area A1, and may be supported on or attached to the moving portion 113b of the support member 113. For example, the second display area A2 may extend along the sliding direction of the first housing 101, may be accommodated inside the second housing 102 together with the support member 113, and may be deformed into an at least partially curved shape according to the deformation of the support member 113.

According to various embodiments, as the first housing 101 slides on the second housing 102, the area of the display 103 exposed to the outside may vary. The electronic device 100 (e.g., a processor) may change the activated area of the display 103 based on the area of the display 103 exposed to the outside. For example, in the opened state or at an intermediate position between the closed state and the opened state, the electronic device 100 may activate the area exposed to the outside of the second housing 102 in the total area of the display 103. In the closed state, the electronic device 100 may activate the first display area A1 of the display 103 and deactivate the second display area A2 of the display 103. In the closed state, when there is no user input for a predetermined period of time (e.g., 30 seconds or 2 minutes), the electronic device 100 may deactivate the entire area of the display 103. According to an embodiment, in the state in which the entire area of the display 103 is deactivated, the electronic device 100 may provide visual information through an auxiliary display area (e.g., a portion of the rear surface case 121a and/or the rear surface plate 121b made of a light transmissive material) by activating a partial area of the display 103 as needed (e.g., for providing a notification or a missed call/message arrival notification according to a user setting).

According to various embodiments, in the opened state (e.g., the state illustrated in FIGS. 2A-2D), substantially the entire area of the display 103 (e.g., the first display area A1 and the second display area A2) may be exposed to the outside, and the first display area A1 and the second display area A2 may be disposed to define a flat surface. According to an embodiment, even in the opened state, a portion (e.g., one end) of the second display area A2 may be located corresponding to the roller 151, and the portion corresponding to the roller 151 in the second display area A2 may be maintained in a curved shape. For example, in various embodiments disclosed herein, even when it is described that "in the opened state, the second display area A2 is disposed to define a flat surface", a portion of the second display area A2 may be maintained in a curved shape. Similarly, even when it is described that "in the closed state, the support member 113 and/or the second display area A2 are accommodated in the second housing 102, a portion of the support member 113 and/or the second display area A2 may be located outside the second housing 102.

According to various embodiments, a guide member (e.g., the roller 151) may be rotatably mounted on the second housing 102 at a position adjacent to one side edge of the second housing 102 (e.g., the rear surface case 121a). For example, the roller 151 may be disposed adjacent to the edge of the rear surface case 121a parallel to the first side wall 123a (e.g., the portion indicated by reference numeral "IE"). Although reference numerals are not assigned in the drawings, another side wall may extend from the edge of the rear surface case 121a adjacent to the roller 151, and the side wall adjacent to the roller 151 may be substantially parallel to the first side wall 123a. As mentioned above, the side wall of the second housing 102 adjacent to the roller 151 may be made of a light transmissive material, and a portion of the second display area A2 may provide visual information through a portion of the second housing 102 in the state of being accommodated in the second housing 102.

According to various embodiments, one end of the roller 151 may be rotatably coupled to the second side wall 123b, and the other end may be rotatably coupled to the third side wall 123c. For example, the roller 151 may be mounted on the second housing 102 to be rotatable about a rotation axis R perpendicular to the sliding direction of the first housing 101 (e.g., the direction indicated by arrow in FIG. 1B or FIG. 2B). The rotation axis R may be disposed substantially parallel to the first side wall 123a, and may be located at one edge of the rear surface case 121a. According to an embodiment, the gap between the outer circumferential surface of the roller 151 and the inner surface of the edge of the rear surface case 121a may define an inlet that allows the support member 113 and/or the display 103 to enter the second housing 102.

According to various embodiments, when the display 103 is deformed into a curved shape, the roller 151 may suppress excessive deformation of the display 103 by maintaining the radius of curvature of the display 103 to a certain degree. The "excessive deformation" may mean that the display 103 is deformed to have a radius of curvature that is small enough to damage pixels or signal wires included in the display 103. For example, the display 103 may be moved or deformed while being guided by the roller 151, and may be protected from damage due to excessive deformation. According to an embodiment, the roller 151 may rotate while the support member 113 or the display 103 is inserted into the second housing 102 or extracted to the outside of the electronic device 100. For example, the roller 151 may reduce the friction between the support member 113 (or the display 103) and the second housing 102 to allow the support member 113 (or the display 103) to move smoothly relative to the second housing 102.

According to various embodiments, the electronic device 100 may include at least one elastic member 131 or 133 made of a low-density elastic body, such as sponge, or a brush. For example, the electronic device 100 may include a first elastic member 131 mounted on one end of the display 103, and in some embodiments, may further include a second elastic member 133 mounted on the inner surface of an edge of the rear surface case 121a. The first elastic member 131 may be substantially disposed in the inner space of the second housing 102, and in the opened state (e.g., the state illustrated in FIGS. 2A-2B), the first elastic member 131 may be located corresponding to the edge of the rear surface case 121a. In an embodiment, the first elastic member 131 may move in the inner space of the second housing 102 in response to the sliding of the first housing 101. When the first housing 101 moves from the closed state to the opened state, the first elastic member 131 may move toward the edge of the rear surface case 121a. When the first housing 101 reaches the opened state, the first elastic member 131 may come into contact with the inner surface of the edge of the rear surface case 121a. For example, in the opened state, the first elastic member 131 may seal the gap between the inner surface of the edge of the rear surface case 121a and the surface of the display 103. In another embodiment, when moving from the closed state to the opened state, the first elastic member 131 may move while being in contact with the rear surface case 121a (e.g., slide contact). For example, when foreign matter is introduced into the gap between the second display area A2 and the rear surface case 121a in the closed state, the first elastic member 131 may discharge the foreign matter to the outside of the second housing 102 while moving to the opened state.

According to various embodiments, the second elastic member 133 may be attached to the inner surface at the edge of the rear surface case 121a, and may be disposed to substantially face the inner surface of the display 103. In the closed state, the gap (e.g., the arrangement gap) between the surface of the display 103 and the inner surface of the edge of the rear surface case 121a may be substantially determined by the second elastic member 133. According to an embodiment, in the closed state, the second elastic member 133 may substantially seal the space between the display 103 and the rear surface case 121a by being in contact with the surface of the display 103. According to an embodiment, the second elastic member 133 may be made of a low-density elastic body, such as sponge, or a brush, to prevent the surface of the display 103 from being damaged even when the second elastic member 133 comes into direct contact with the display 103. In another embodiment, as the first housing 101 gradually moves to the opened state, the gap between the rear surface case 121a and the second elastic member 133 may increase. For example, the display 103 may not substantially come into contact with or rub against the second elastic member 133, and the second display area A2 may be exposed to the outside of the second housing 102. When the first housing 101 is in the opened state, the first elastic member 131 may come into contact with the second elastic member 133 to block the inflow of external foreign matter.

According to various embodiments, the electronic device 100 may further include a support sheet 153. According to an embodiment, the support sheet 153 may be located between the support member 113 and the roller 151, and the support member 113 may be connected to the roller 151 via the support sheet 153. According to an embodiment, the support sheet 153 may be omitted, and the support member 113 may be connected to the roller 151. According to an embodiment, the support sheet 153 may be made of a flexible and somewhat elastic material, for example, a material including an elastic body such as silicone or rubber, may be mounted or attached to the roller 151, and may be selectively wound around the roller 151 as the roller 151 rotates. In the illustrated embodiment, a plurality of (e.g., four) support sheets 153 may be arranged along the direction of the rotation axis R of the roller 151. For example, the plurality of support sheets 153 may be mounted on the roller 151 such that adjacent support sheets 153 are spaced apart from each other by a predetermined interval, and may extend in a direction perpendicular to the rotation axis R. In other embodiments, a single support sheet may be mounted or attached to roller 151. For example, the single support sheet may have a size and shape corresponding to the areas where the support sheets 153 are disposed and the areas between the support sheets 153 in FIG. 3. In this way, the number, size, or shape of the support sheets 153 may be appropriately changed depending on an actually manufactured product. In some embodiments, the support sheets 153 may be rolled on the outer circumferential surface of the roller 151 as the roller 151 rotates, or may be spread out from the roller 151 in a flat plate shape from the spaces between the display 103 and the third plate 121c. In another embodiment, the support sheets 153 may be referred to as a "support belt," an "auxiliary belt," a "support film," or an "auxiliary film."

According to various embodiments, an end of each support sheet 153 may be connected to the first housing 101 (e.g., the first plate 111a (e.g., a slide plate)), and the support sheets 153 may be rolled on the roller 151 in the closed state (e.g., the state illustrated in FIGS. 1A-1F). Accordingly, when the first plate 111a moves to the opened state (e.g., the state illustrated in FIG. 2A), the support sheets 153 may be gradually located in the space between the second housing 102 (e.g., the third plate 121c) and the display 103 (e.g., the second display area A2) or in the space between the second housing 102 (e.g., the third plate 121c) and the support member 113. For example, the support sheets 153 may be located to at least partially face the support member 113, and may be selectively wound around the roller 151 in response to the sliding of the first plate 111a. The support sheets 153 may be generally disposed to be in contact with the support member 113, but the portions rolled on the roller 151 may be substantially separated from the support member 113.

According to various embodiments, the electronic device 100 may further include at least one actuating member 157. The actuating member 157 may include a spring or a spring module that provides an elastic force in a direction to move opposite ends thereof away from each other. One end of the actuating member may be rotatably supported on the second housing 102 and the other end may be rotatably supported on the first housing 101. According to an embodiment, the actuating member 157 may provide an elastic force to the first housing 101 and/or the support member 113 in a direction moving toward the closed state or in a direction moving toward the opened state.

According to various embodiments, at least one of the first housing 101, the display 103, or the support member 113 may be defined as the display assembly 130. In this document, a description of the first housing 101, the display 103, or the support member 113 moving relative to the second housing 102 may be applied to the display assembly 130 moving relative to the second housing 102.

Figure 4:
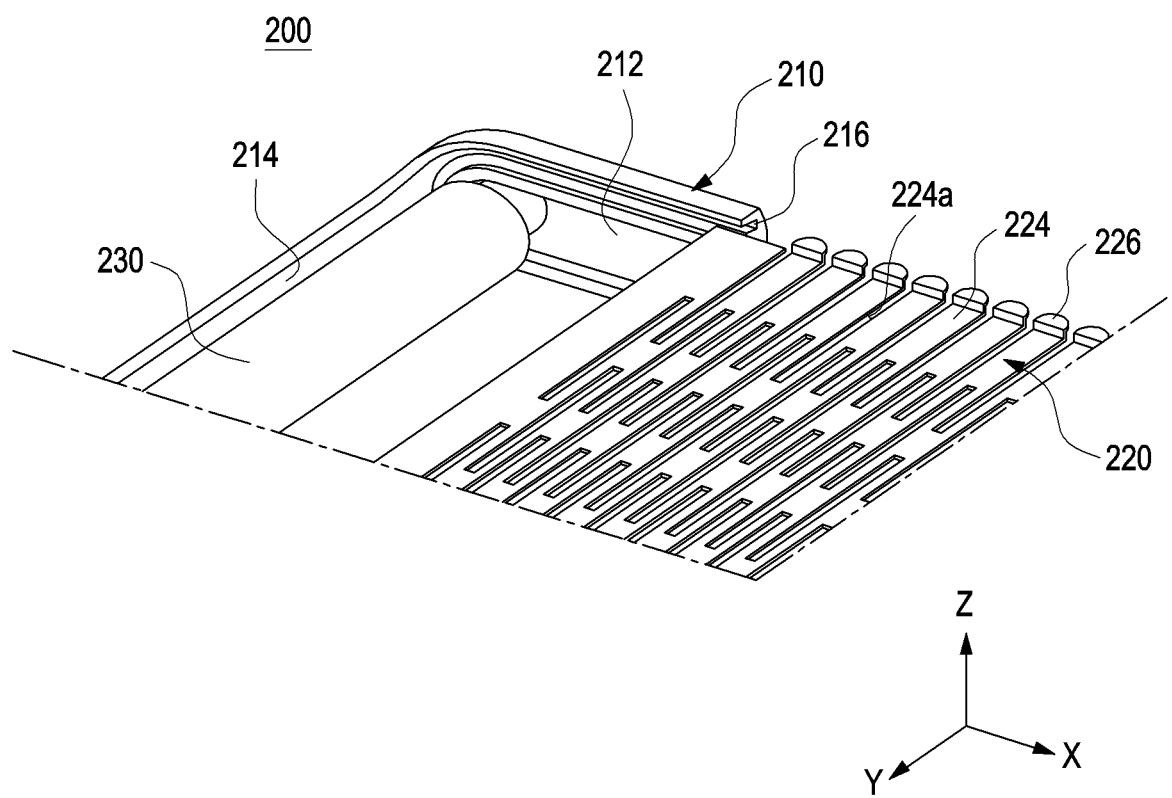
FIG. 4 is a perspective view of the electronic device according to an embodiment of the disclosure.
Figure 5:
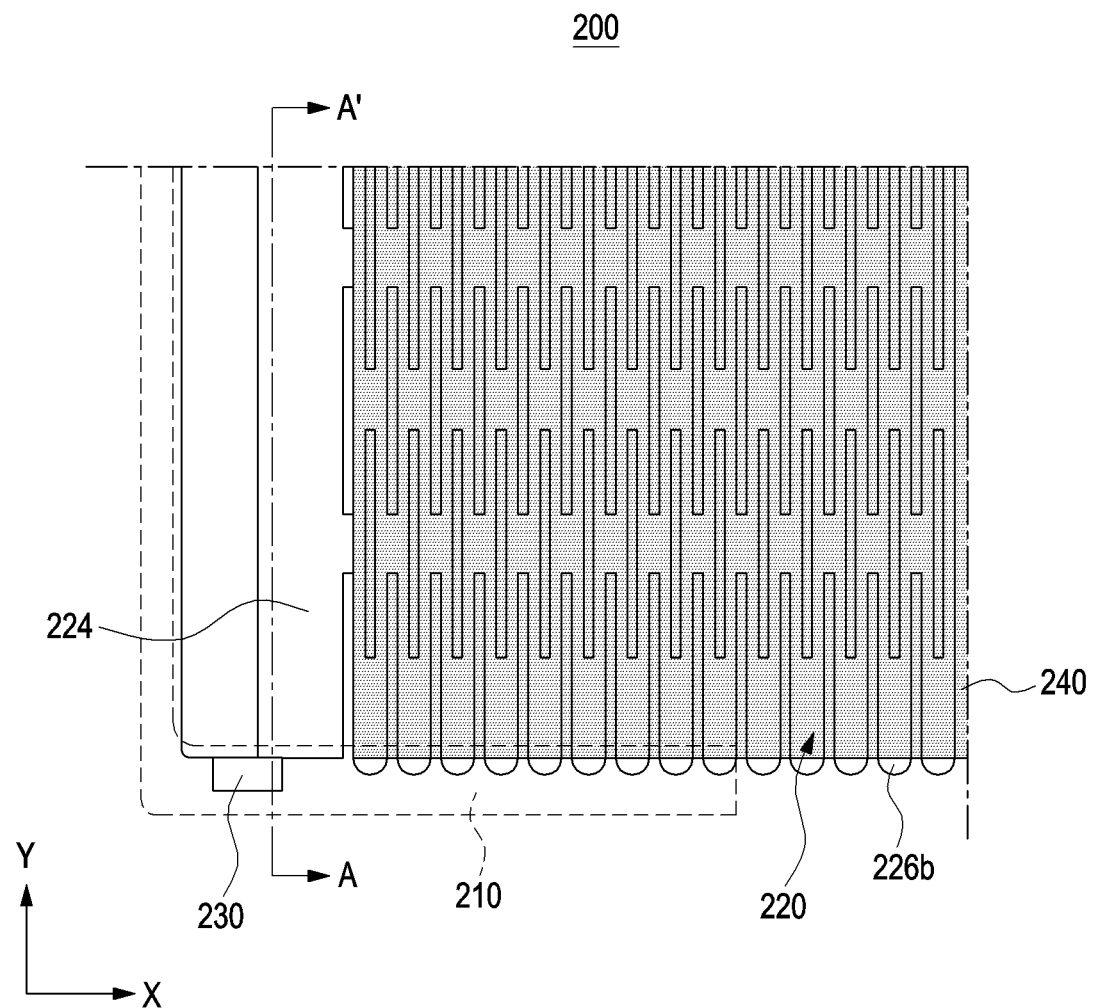
FIG. 5 is a front view of the electronic device according to an embodiment of the disclosure.
Figure 6:
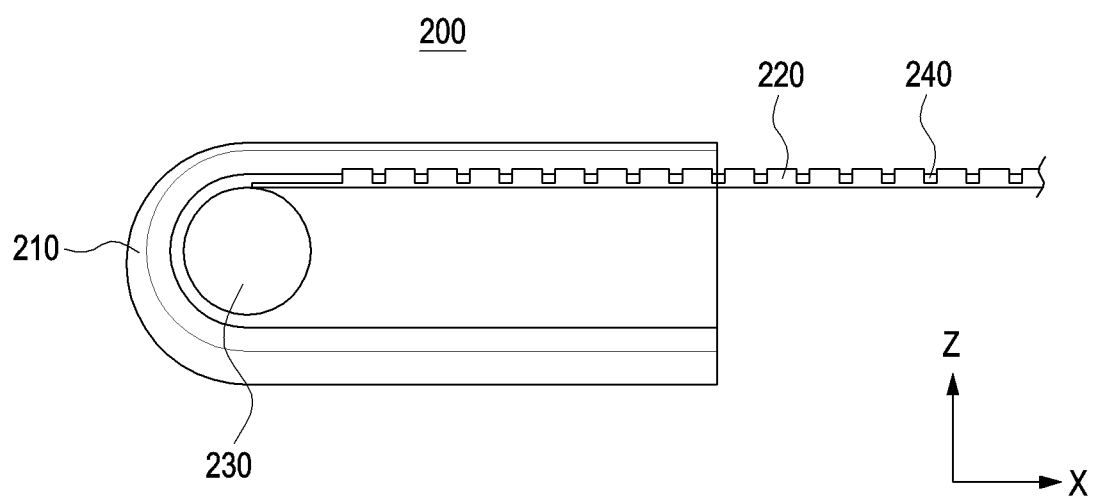
FIG. 6 is a side view of the electronic device according to an embodiment of the disclosure.

FIG. 4 is a perspective view of an electronic device according to an embodiment of the disclosure. FIG. 5 is a front view of the electronic device according to an embodiment of the disclosure. FIG. 6 is a side view of the electronic device according to an embodiment of the disclosure. FIG. 7A is a cross-sectional view taken along line A-A' in FIG. 4. FIG. 7B is a detailed view of a portion of FIG. 7A.

Referring to FIGS. 4 to 7B, an electronic device 200 may include a second housing 210, a display 240, a support member 220, and a roller 230. The configurations of the second housing 210, the support member 220, and the roller 230 of FIGS. 4 to 7 may be wholly or partly the same as the configurations of the second housing 102, the support member 113, and the roller 151 of FIG. 3.

According to various embodiments, the second housing 210 may include a first edge 212 and a second edge 214 substantially perpendicular to the first edge 212. According to an embodiment, the first edge 212 may be a side wall (e.g., the second side wall 123b or the third side wall 123c in FIG. 3) of the second housing 210, and the second edge 214 may be another side wall (e.g., the first side wall 123a in FIG. 3) of the second housing 210.

According to various embodiments, the second housing 210 may guide the sliding of the support member 220. For example, the second housing 210 may include a guide groove 216 for guiding the movement of the support member 220. According to an embodiment, the guide groove 216 may be provided in the inner surface 212a of the first edge 212 (e.g., the second side wall 123b or the third side wall 123c in FIG. 3), and may extend along a first direction (e.g., the X-axis direction) in which the first housing (e.g., the first housing 101 in FIG. 1A) slides. For example, the guide groove 216 may be provided along at least a portion of the circumference of the first edge 212. According to an embodiment, the second housing 210 may include a (2-1)th housing area 210a disposed under the protrusion 226 and facing a first area 226a and a second area 226b, and a $(2\text{-}2)^{th}$ housing area 210b exposed to the outside of the electronic device 200 and facing a second area 226b. According to an embodiment, the guide groove 216 may be located between the $(2\text{-}1)^{th}$ housing area 210a and the $(2\text{-}2)^{th}$ housing area 210b.

According to various embodiments, the guide groove 216 may accommodate at least a portion of the support member 220. For example, the guide groove 216 may include a first guide groove 216a that is capable of accommodating at least a portion of a moving portion 224 and at least a portion of the first area 226a, and a second guide groove 216b extending from the first guide groove 216a and is capable of accommodating at least a portion of the second area 226b.

According to various embodiments, the support member 220 may include a protrusion 226 extending from the moving portion 224. According to an embodiment, the protrusion 226 of the support member 220 may be inserted into the guide groove 216, and the support member 220 may slide relative to the second housing 210 along the guide groove 216.

According to various embodiments, at least a portion of the protrusion 226 may be bent. For example, the protrusion 226 may include a first area 226a protruding in a second direction d2 (e.g., the Z-axis direction) perpendicular to the first direction (e.g., the X-axis direction), and a second area 226b extending from the first area 226a in a third direction d3 different from the second direction d2. According to an embodiment, the bent protrusion 226 may prevent or suppress the separation of the support member 220 from the guide groove 216. For example, when the second area 226b is parallel to the front surface (e.g., the first support member surface 220a) of the support member 220, the support member 220 may vibrate in the length direction (e.g., the Y-axis direction) of the electronic device 200. The protrusion 226 may reduce the movement of the support member 220 in the length direction (the Y-axis direction) of the electronic device 200 by using the second area 226b extending in the third direction d3 different from the second direction d2. According to an embodiment, the moving portion 224, the first area 226a, and the second area 226b may be integrally configured. For example, the moving portion 224 and the protrusion 226 may be portions of the support member 220 which is bent by using an external force.

According to various embodiments, a first angle x1, which is the angle between the first area 226a and the second area 226b, may be provided in various ways. According to an embodiment, the first angle x1 may be greater than 45 degrees and less than 90 degrees. When the first angle x1 is greater than 0 degrees and less than 45 degrees, the angle of the end of the $(2\text{-}1)^{th}$ housing area 210a may be reduced, and thus durability of the second housing 210 may be reduced. When the first angle x1 exceeds 90 degrees, the size of the $(2\text{-}2)^{nd}$ housing area 210b may increase, and thus the size of the electronic device 200 may increase. However, the first angle x1 may be greater than 90 degrees and less than 180 degrees or may be in the range of 0 degrees to 45 degrees.

According to various embodiments, the support member 220 may protect the front surface 240a of the display 240 from an external impact of the electronic device 200. For example, a third length h1, which is the length from the first support member surface 220a of the support member 220 to the end of the first area 226a, may be longer than a fourth length h2, which is a length from the rear surface 240b of the display 240 that faces the first support member surface 220a to the front surface 240a of the display 240 that is exposed to the outside of the electronic device 200. According to an embodiment, a portion of the first area 226a or at least a portion of the second area 226b of the protrusion 226 may be located in the second direction d2 with respect to the front surface 240a of the display 240. The configuration of the display 240 of FIGS. 5 to 7 may be wholly or partially the same as the configuration of the display 103 of FIGS. 1A to 3.

According to various embodiments, the support member 220 may protect the side surface 240c of the display 240 from an external impact of the electronic device 200. For example, the first area 226a of the protrusion 226 may surround at least a portion of the side surface 240c of the display 240. According to an embodiment, the protrusion 226 may surround at least a portion of the second display area (e.g., the second display area A2 in FIG. 2A).

According to various embodiments, the protrusion 226 of the support member 220 may have a structure configured to reduce a frictional force generated due to contact with the guide groove 216. For example, a portion (e.g., an end portion) of the second area 226b may be configured in a curved surface.

According to various embodiments, the roller 230 may be mounted on the first edge 212 of the second housing 210 to be rotatable with respect to the second housing 210. According to an embodiment, the roller 230 may extend along the second edge 214 of the second housing 210 substantially perpendicular to the first edge 212. According to an embodiment, the roller 230 may include a first roller area 232 connected to the second housing 210, and a second roller area 234 extending from the first roller area 232 and connected to the support member 220. According to an embodiment, a portion of the display 240 (e.g., the second display area A2 in FIG. 2A) and the moving portion 224 of the support member 220 may move along the roller 230 in the first direction (e.g., the X-axis direction), and the roller 230 may rotate with respect to the second housing 210. According to an embodiment, the first roller area 232 and the second roller area 234 may be integrally configured.

Figures 8A, 8B:
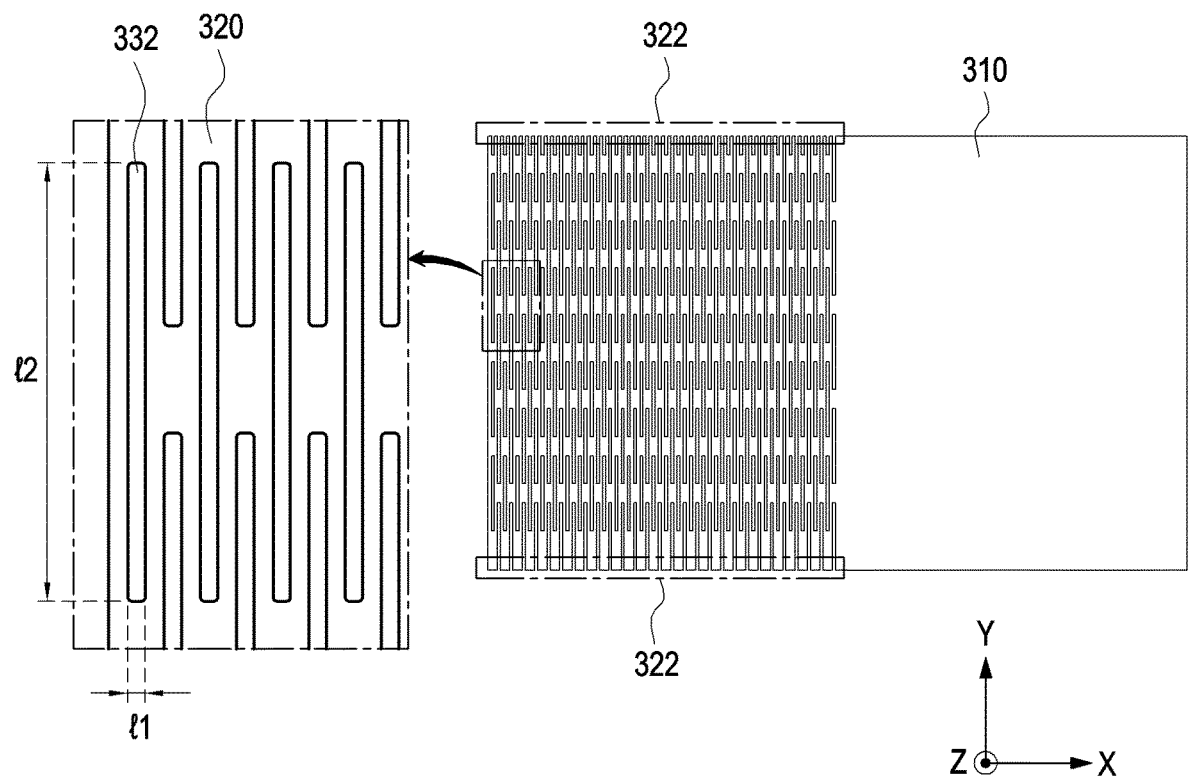
FIG. 8A is a front view of a support member according to various embodiments of the disclosure.
FIG. 8B is a detailed view of a portion of FIG. 8A.
Figure 9A:
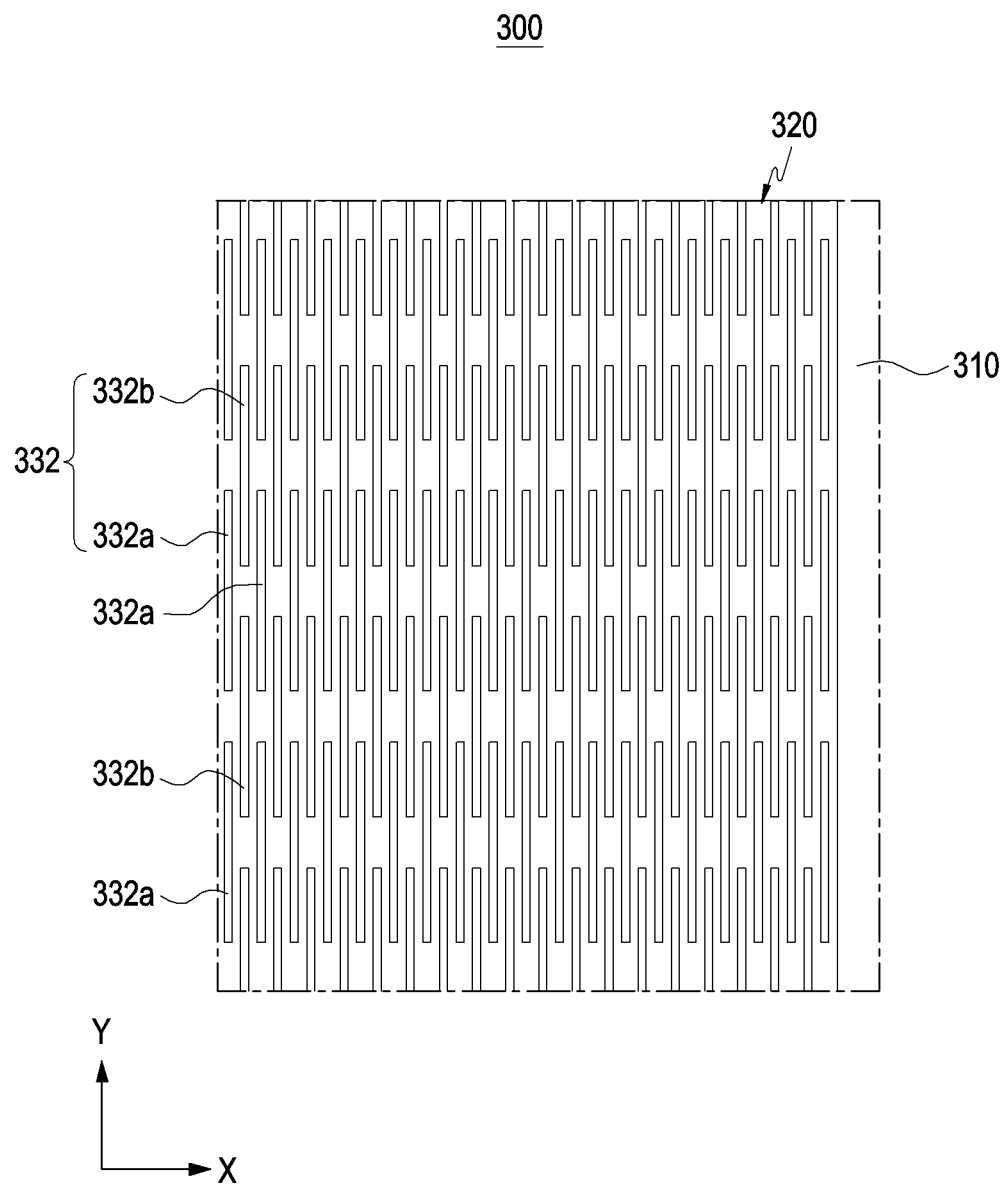
FIGS. 9A, 9B, and 9C are front views of moving portions according to various embodiments of the disclosure.
Figure 9B:
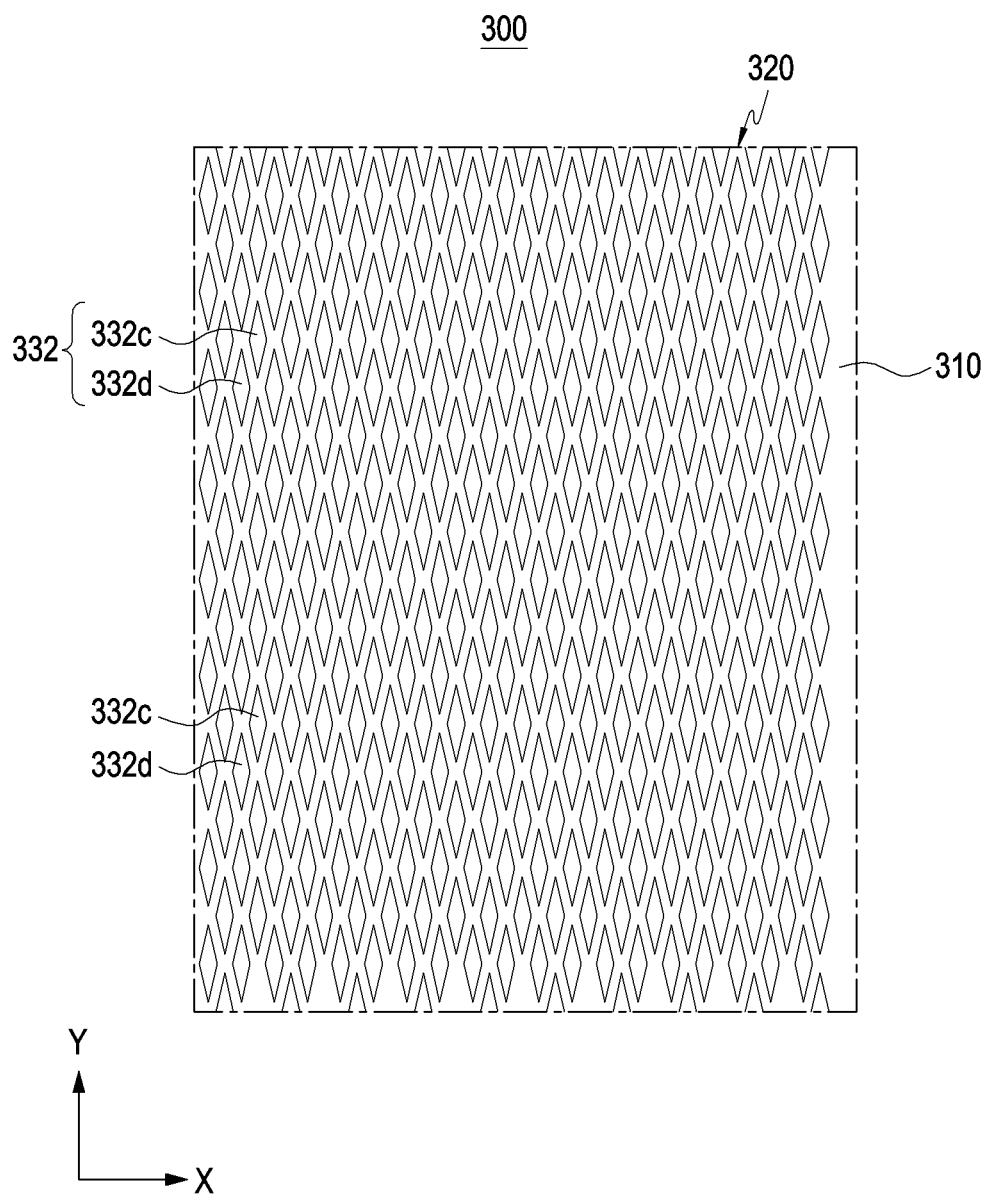
Figure 9C:
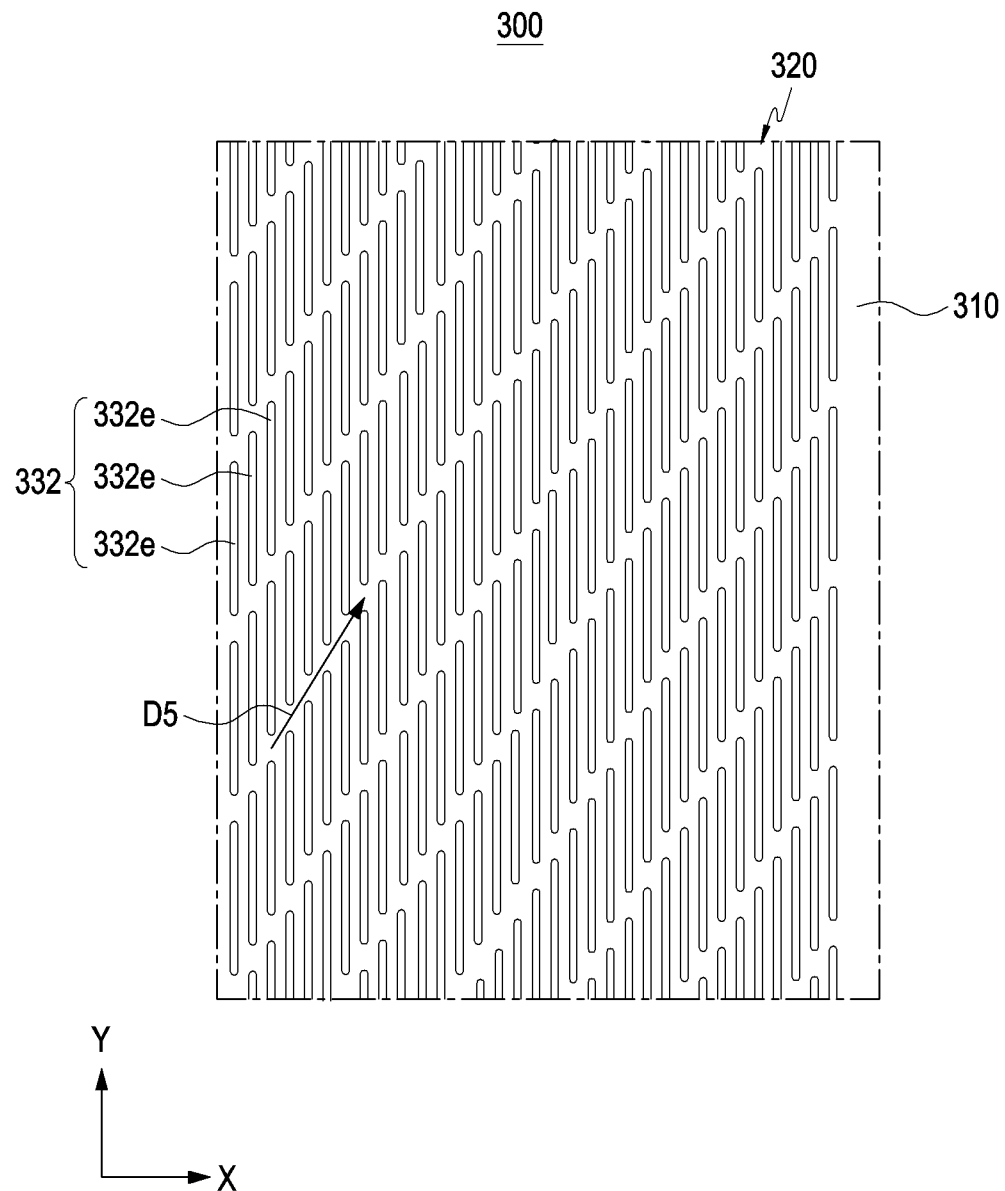
Figure 10A:
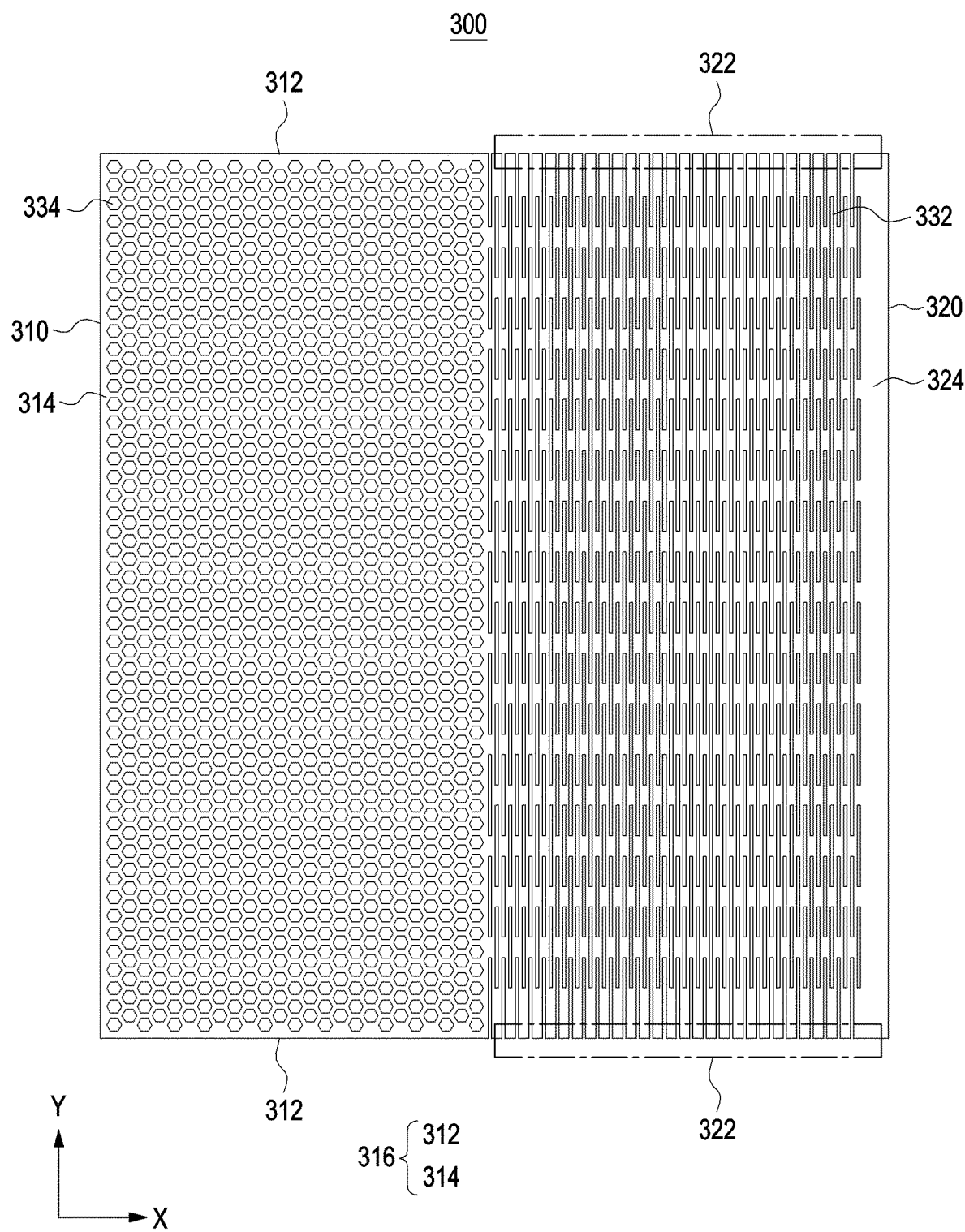
FIGS. 10A and 10B are front views of support members each including a fixed portion provided with a through-pattern according to various embodiments of the disclosure.
Figure 10B:
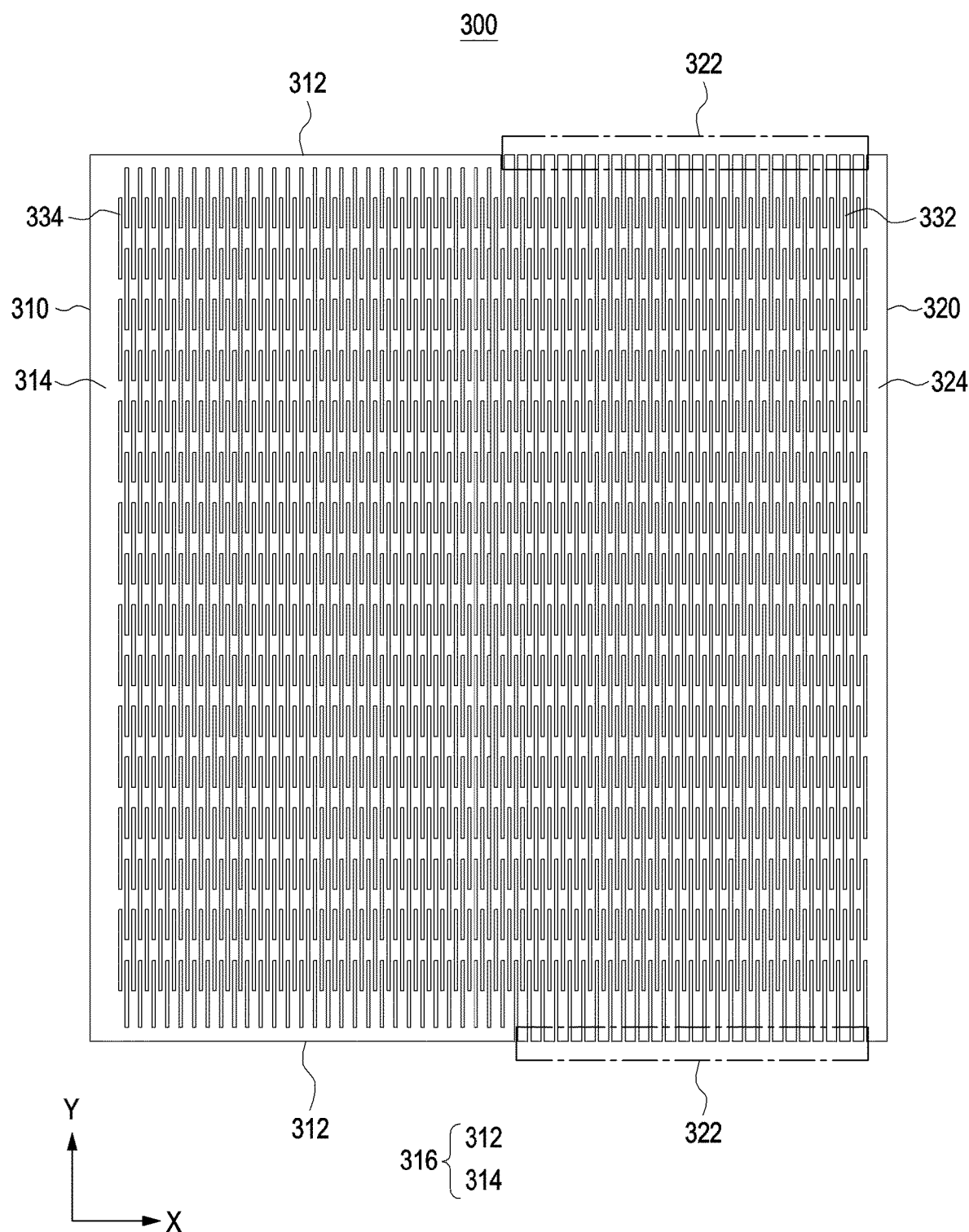

FIG. 8A is a front view of a support member according to various embodiments of the disclosure. FIG. 8B is a detailed view of a portion of FIG. 8A. FIGS. 9A, 9B, and 9C are front views of moving portions according to various embodiments of the disclosure. FIGS. 10A and 10B are front views of support members each including a fixed portion provided with a through-pattern according to various embodiments of the disclosure.

Referring to FIGS. 8A, 8B, 9A, 9B, 9C, 10A, and 10B, each support member 300 may include a fixed portion 310 and a moving portion 320 extending from the fixed portion 310. The configuration of each of the support members 300 of FIGS. 8A, 8B, 9A, 9B, 9C, 10A, and 10B may be wholly or partly the same as the configuration of the support member 220 of FIGS. 4 to 7.

According to various embodiments, the support member 300 may be made of a single plate material. For example, the fixed portion 310, the moving portion 320, and the protrusion (e.g., the protrusion 226 in FIG. 4) of the support member 300 may be integrally configured. According to an embodiment, the support member 300 may be made of stainless steel (steel use stainless (SUS)).

According to various embodiments, the support member 300 may include at least one through-pattern 330. According to an embodiment, the through-pattern 330 may be a hole or recess provided in the support member 300 through laser processing and/or chemical corrosion. According to an embodiment, the through-pattern 330 may have a lattice structure.

According to various embodiments, the through-pattern 330 may include at least one first through-pattern 332 provided in the moving portion 320. The first through-pattern 332 may increase flexibility of the support member 300 in the first direction (e.g., the X-axis direction). For example, a first length l1 of the first through-pattern 332 in the first direction (e.g., the X-axis direction) may be shorter than a second length l2 in a fifth direction (e.g., the Y-axis direction) substantially perpendicular to the first direction (e.g., the X-axis direction) or the second direction (e.g., the Z-axis direction).

According to various embodiments, the moving portion 320 includes at least one (e.g., two) first border 322 located in the length direction (e.g., the Y-axis direction), and a portion of the first border 322 may be eliminated. For example, at least a portion of the first through-pattern 332 may be provided in the first border 322 of the moving portion 320. According to an embodiment, at least a portion of the first through-pattern 332 may be exposed to the outside of the support member 300. For example, the moving portion 320 may include a plurality of borders 322 and a second border 324 located between the plurality of first borders 322 in the first direction or width direction (e.g., the X-axis direction) of the support member 300. The first through-pattern 332 may be covered by the second border 324 in the width direction (the X-axis direction) and exposed to the outside of the support member 300 in the length direction (the Y-axis direction). According to an embodiment, as the first border 322 of the moving portion 320 is partially removed, the flexibility of the moving portion 320 in the length direction (e.g., the Y-axis direction) may be greater than flexibility of the moving portion 320 in the width direction (e.g., the X-axis direction).

According to various embodiments, the first through-pattern 332 may have various shapes. According to an embodiment (e.g., FIG. 9A), the first through-pattern 332 may include a plurality of substantially rectangular first through-patterns 332a and 332b which are spaced apart from each other. For example, the first through patterns 332 may include a plurality of $(1-1)^{th}$ through-patterns 332a arranged along the width direction (e.g., the X-axis direction) of the support member 300 and a plurality of $(1-2)^{th}$ through-patterns 332b spaced apart from the plurality of $(1-1)^{th}$ patterns 332a in the width direction and the length direction (e.g., the Y-axis direction) of the supporting member 300. According to an embodiment (e.g., FIG. 9B), the first through-patterns 332 may include a plurality of substantially rhombic first through-patterns 332a and 332d which are spaced apart from each other. For example, the first through patterns 332 may include a plurality of $(1-3)^{th}$ through patterns 332c arranged along the width direction (e.g., the X-axis direction) of the support member 300 and a plurality of $(1-4)^{th}$ through-patterns 332d spaced apart from the $(1-3)^{th}$ through-patterns 332d in the width direction (X-axis direction) and the length direction (e.g., the Y-axis direction) of the support member 300. Each of the $(1-3)^{th}$ through-patterns 332c may be surrounded by the plurality of $(1-4)^{th}$ through-patterns 332d, and each of the $(1-4)^{th}$ through patterns 332d may be surrounded by the plurality of $(1-3)^{th}$ through-patterns 332c. According to an embodiment (e.g., FIG. 9C), the first through-pattern 332 may have a substantially rectangular shape. The first through patterns 332 may include a plurality of $(1-5)^{th}$ through-patterns 332e arranged along an arbitrary direction (e.g., a fifth direction d5) between the width direction (the X-axis direction) and the length direction (the Y-axis direction) of the support member 300.

According to various embodiments, the fixed portion 310 may include one or more second through-patterns 334. According to an embodiment, the weight of the support member 300 including the second through-patterns 334 may be less than the weight of the support member not including the fixed portion 310 (e.g., the support member 300 in FIG. 8A).

According to various embodiments, the fixed portion 310 may include a border area 316 including a plurality of third borders 312 located in the length direction (e.g., the Y-axis direction) and a fourth border 314 located between the third borders 312. The border area 316 may surround the second through-patterns 334. For example, the fixed portion 310 including the second through-patterns 334 may be surrounded by the border area 316, and the flexibility of the fixed portion 310 may be lower than that of the moving portion 320.

According to various embodiments, the second through-pattern 334 may have various shapes. According to an embodiment (e.g., FIG. 10A), the second-through pattern 334 may have a circular or hexagonal shape. For example, the length of each second through pattern 334 in the width direction (e.g., the X-axis direction) may be substantially the same as the length in the length direction (e.g., the Y-axis direction). According to an embodiment (e.g., FIG. 10B), the shape of the second through patterns 334 may be substantially the same as that of the first through-patterns 334.

Figure 11:
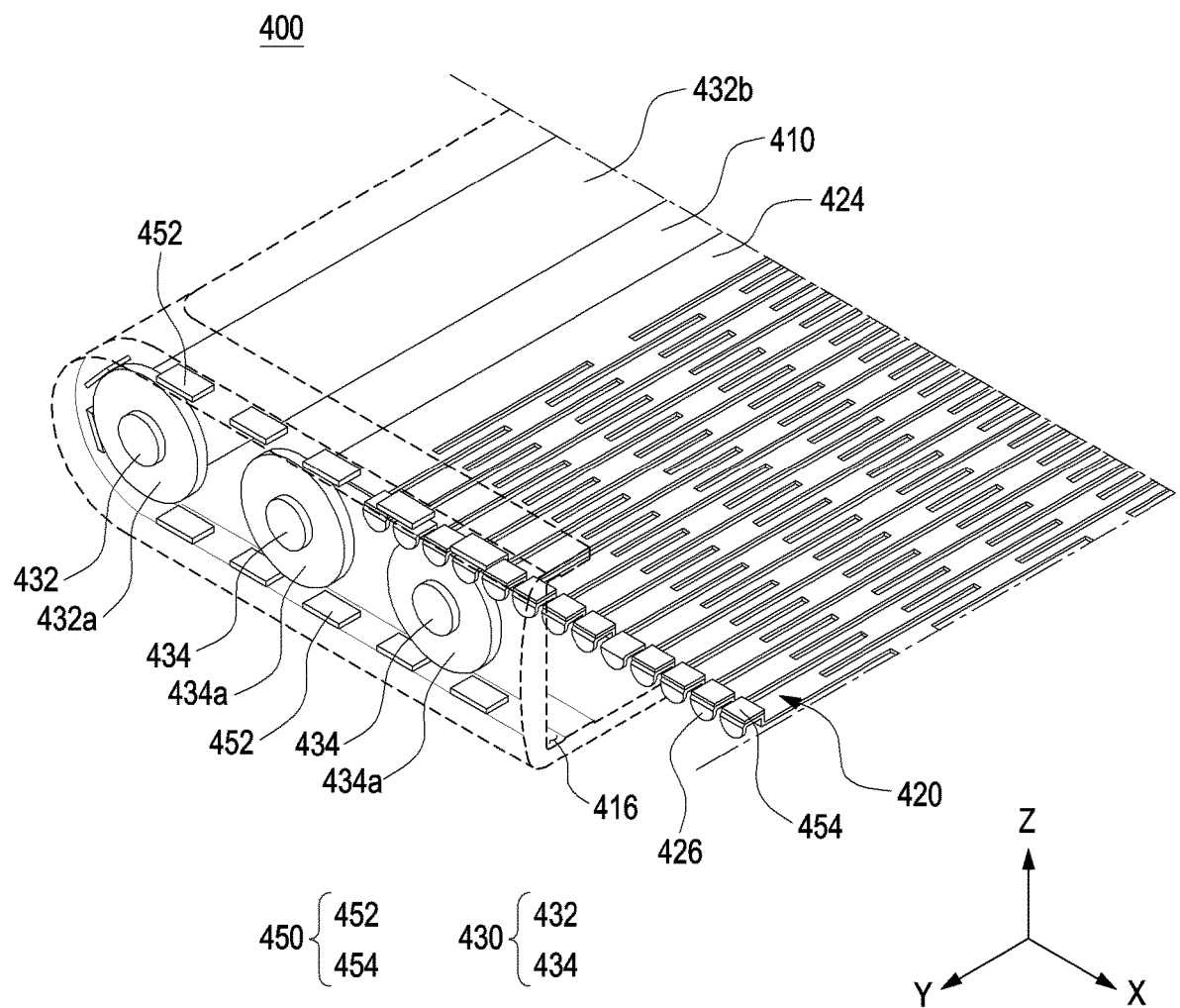
FIG. 11 is a perspective view of an electronic device including a magnet according to various embodiments of the disclosure.
Figure 12:
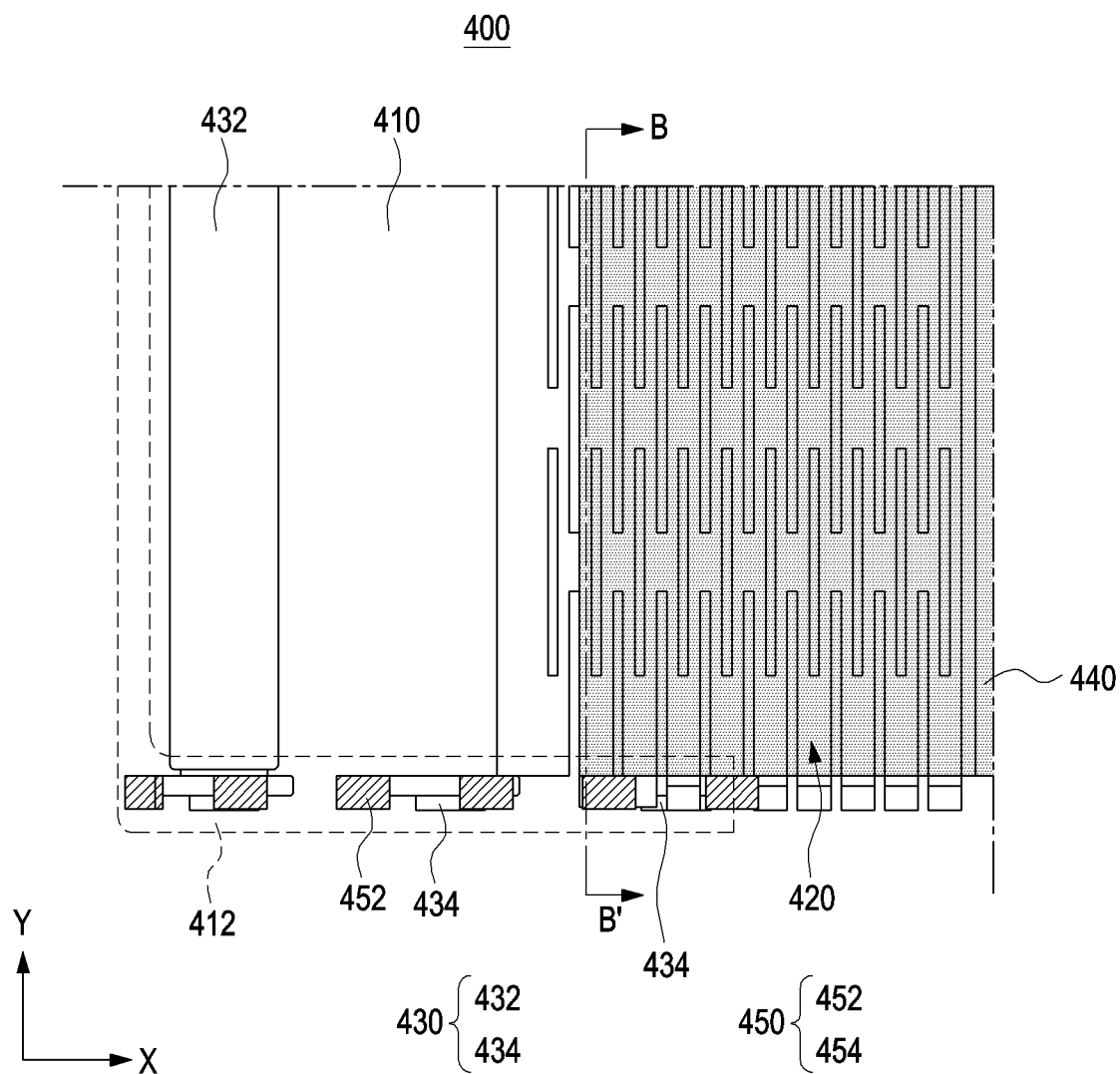
FIG. 12 is a front view illustrating the electronic device including a magnet according to various embodiments of the disclosure.
Figures 13A, 13B:
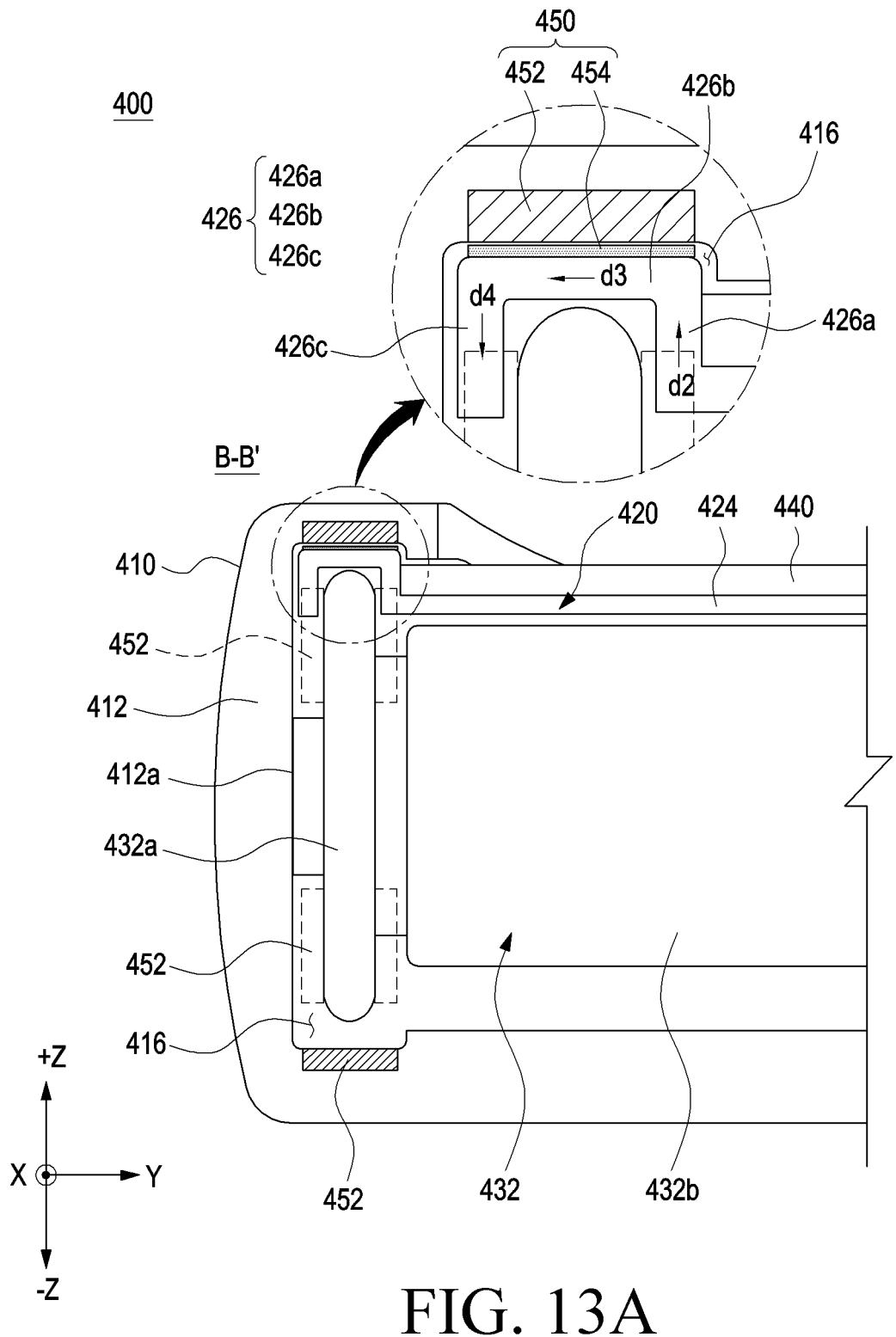
FIG. 13A is a cross-sectional view taken along line B-B' in FIG. 12.
FIG. 13B is a detailed view of a portion of FIG. 13A.
Figure 14A:
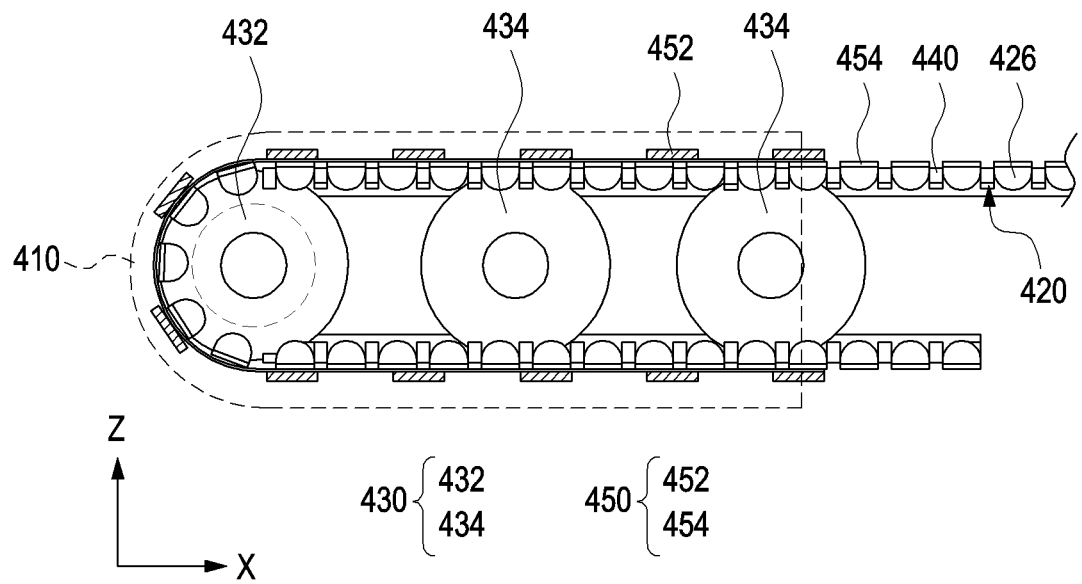
FIG. 14a is a side view of the electronic device including a magnet according to various embodiments of the disclosure in the closed state.
Figure 14B:
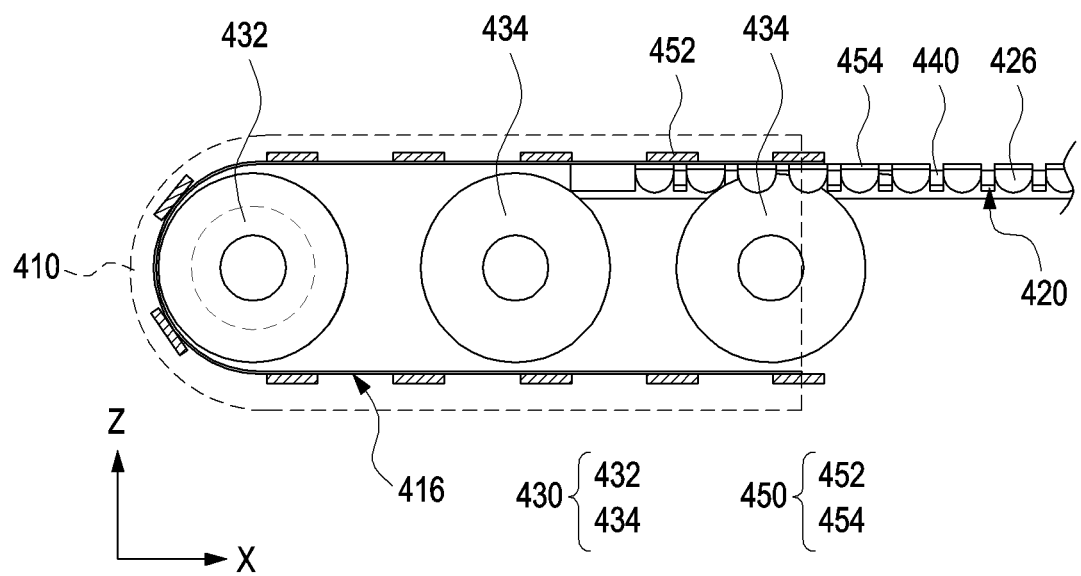
FIG. 14b is a side view of the electronic device including a magnet according to various embodiments of the disclosure in the opened state.

FIG. 11 is a perspective view of an electronic device including a magnet according to various embodiments of the disclosure. FIG. 12 is a front view illustrating the electronic device including a magnet according to various embodiments of the disclosure. FIG. 13 is a cross-sectional view taken along line B-B' in FIG. 12. FIG. 14a is a side view of the electronic device including a magnet according to various embodiments of the disclosure in the closed state, and FIG. 14b is a side view of the electronic device including a magnet according to various embodiments of the disclosure in the opened state.

Referring to FIGS. 11, 12, 13, 14a and 14b, an electronic device 400 may include a second housing 410, a support member 420, a roller 430, and a display 440. The configurations of the electronic device 400, the second housing 410, the support member 420, the roller 430, and the display 440 of FIGS. 11, 12, 13, 14A, and 14B may be wholly or partly the same as those of the electronic device 200, the second housing 210, the support member 220, the roller 230, and the display 240 of FIGS. 4 to 7.

According to various embodiments, the second housing 410 may include a guide groove 416. According to an embodiment, the guide groove 416 may accommodate a portion of the roller 230 (e.g., the first roller wheel 432a) and a portion of the support member 420 (e.g., the protrusion 426). According to an embodiment, the guide groove 416 may be provided in the inner surface 412a of a first edge 412 of the second housing 410.

According to various embodiments, the support member 420 may include a moving portion 424 and a protrusion 426 extending from the moving portion 424. According to an embodiment, the protrusion 426 may be inserted into the guide groove 416, and the support member 220 may slide relative to the second housing 210 along the guide groove 416.

According to various embodiments, at least a portion of the protrusion 426 may be bent. For example, the protrusion 426 may include a first area 426a protruding in a second direction d2 (e.g., the +Z direction) perpendicular to the first direction d1 (e.g., the X-axis direction), a second area 426b extending from the first area 426a in a third direction d3 different from the second direction (the +Z direction), and a third area 426c extending from the second area 426b in a fourth direction d4 (e.g., the −Z direction) opposite to the second direction d2. According to an embodiment, the third direction d3 may be perpendicular to the second direction (the +Z direction), and the second area 426b may be perpendicular to the first area 426a and the third area 426c. The third area 426c may face the first area 426a. According to an embodiment, the protrusion 426 may face the roller 430 and may prevent or suppress the separation of the support member 420 from the roller 430. For example, a portion of the roller 430 (e.g., the first roller wheel 432a) may face the first area 426a, the second area 426b, and the third area 426c of the protrusion 426, and the movement of the support member 420 in the length direction (the Y-axis direction) of the electronic device 400 may be reduced by the first roller wheel 432a.

According to various embodiments, the roller 430 may include a first roller 432 and at least one second roller 434 spaced apart from the first roller 432.

According to various embodiments, the first roller 432 may be mounted on the first edge 412 of the second housing 410 to be rotatable with respect to the second housing 410, and may extend along the second edge 414 of the second housing 410 substantially perpendicular to the first edge 412.

According to various embodiments, the first roller 432 may include a first roller wheel 432a rotatably mounted on the first edge 412 and a bar structure 432b extending from the first roller wheel 432a and connected to the support member 420. According to an embodiment, at least a portion of the first roller wheel 432a may be inserted into the protrusion 426 to guide the motion of the support member 420. According to an embodiment, the first roller wheel 432a may be disposed at each end of the bar structure 432b. For example, the first roller wheels 432a may be disposed on side walls (e.g., the second side wall 123b and the third side wall 123c) of the second housing 410. According to an embodiment, the first roller wheel 432a and the bar structure 432b may be integrally configured.

According to various embodiments, the second roller 434 may include at least one second roller wheel 434a spaced apart from the first roller wheel 432a in the first direction (e.g., the X-axis direction). According to an embodiment, at least a portion of the second roller wheel 434a may be inserted into the protrusion 426 to guide the motion of the support member 420. According to an embodiment, the first roller wheel 432a and the second roller wheel 434a may have a circular shape in order to reduce a frictional force generated between the first and second roller wheels and the support member 420.

According to various embodiments, the electronic device 400 may further include at least one magnet 450 configured to reduce the frictional force between the support member 420 and the second housing 410. For example, the electronic device 400 may include at least one first magnet 452 and at least one second magnet 454 to provide a repulsive force to the first magnet 452. According to an embodiment, the first magnet 452 and the second magnet 454 may be arranged such that, when the first magnet 452 and the second magnet 454 face each other, the polarities of the first magnet 452 and the second magnet 454 are the same.

According to various embodiments, the first magnet 452 may be disposed adjacent to the guide groove 416. According to an embodiment, the first magnet 452 may be disposed within the second housing 410. According to an embodiment, the first magnet 452 may be disposed on the inner surface 412a of the first edge 412.

According to various embodiments, the second magnet 454 may be disposed on the support member 420. For example, the second magnet 454 may be disposed on the second area 426b of the protrusion 426. According to an embodiment, when the support member 420 moves along the guide groove 416, at least a portion of the second magnet 454 may face at least a portion of the first magnet 452, and the frictional force generated between the support member 420 and the guide groove 416 of the second housing 410 may be reduced.

According to various embodiments, at least one of the first roller wheel 432a or the second roller wheel 434a may face a portion of the protrusion 426 (e.g., the second area 426b). When the first roller wheel 432a and the second roller wheel 434a roll with respect to the second area 426b of the protrusion 426, and the support member 520 and/or the display 540 slide with respect to the second housing 510, the generated frictional force may be reduced.

Figure 15:
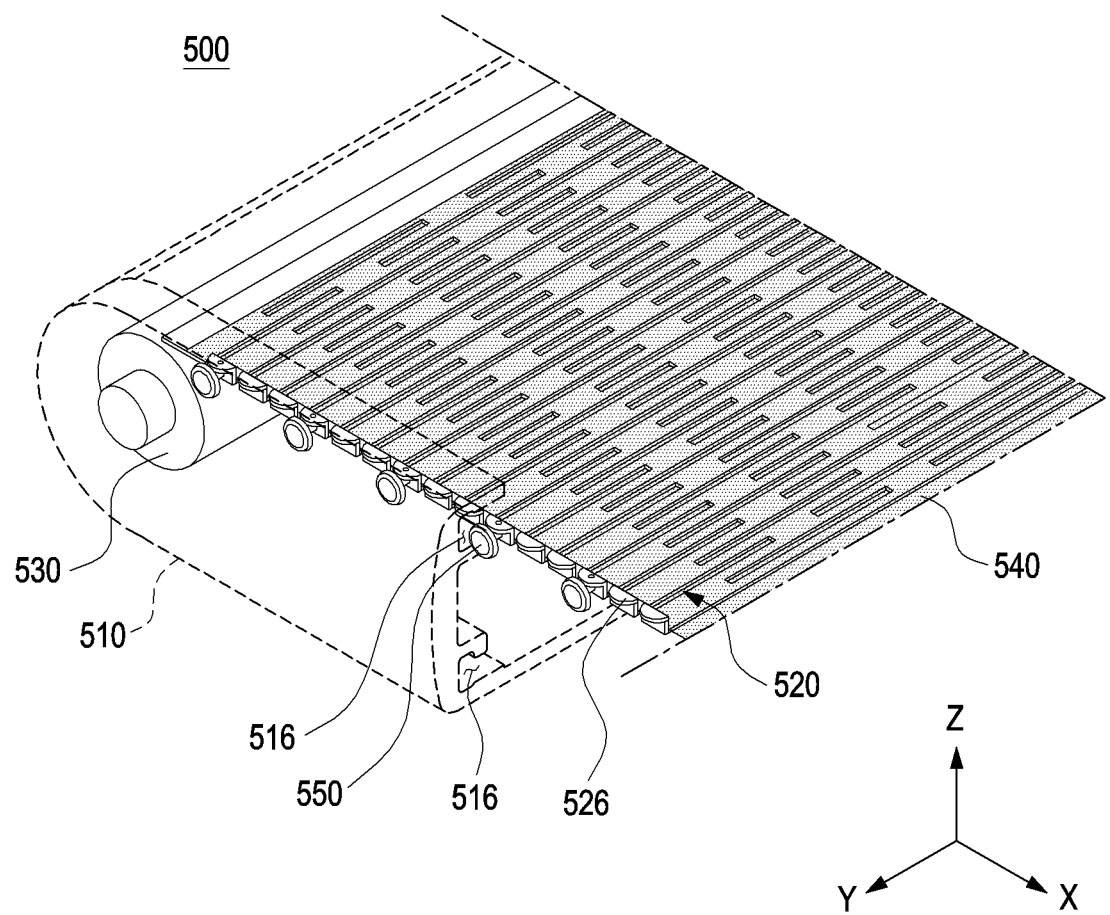
FIG. 15 is a perspective view of an electronic device including a wheel structure according to various embodiments of the disclosure.
Figure 16:
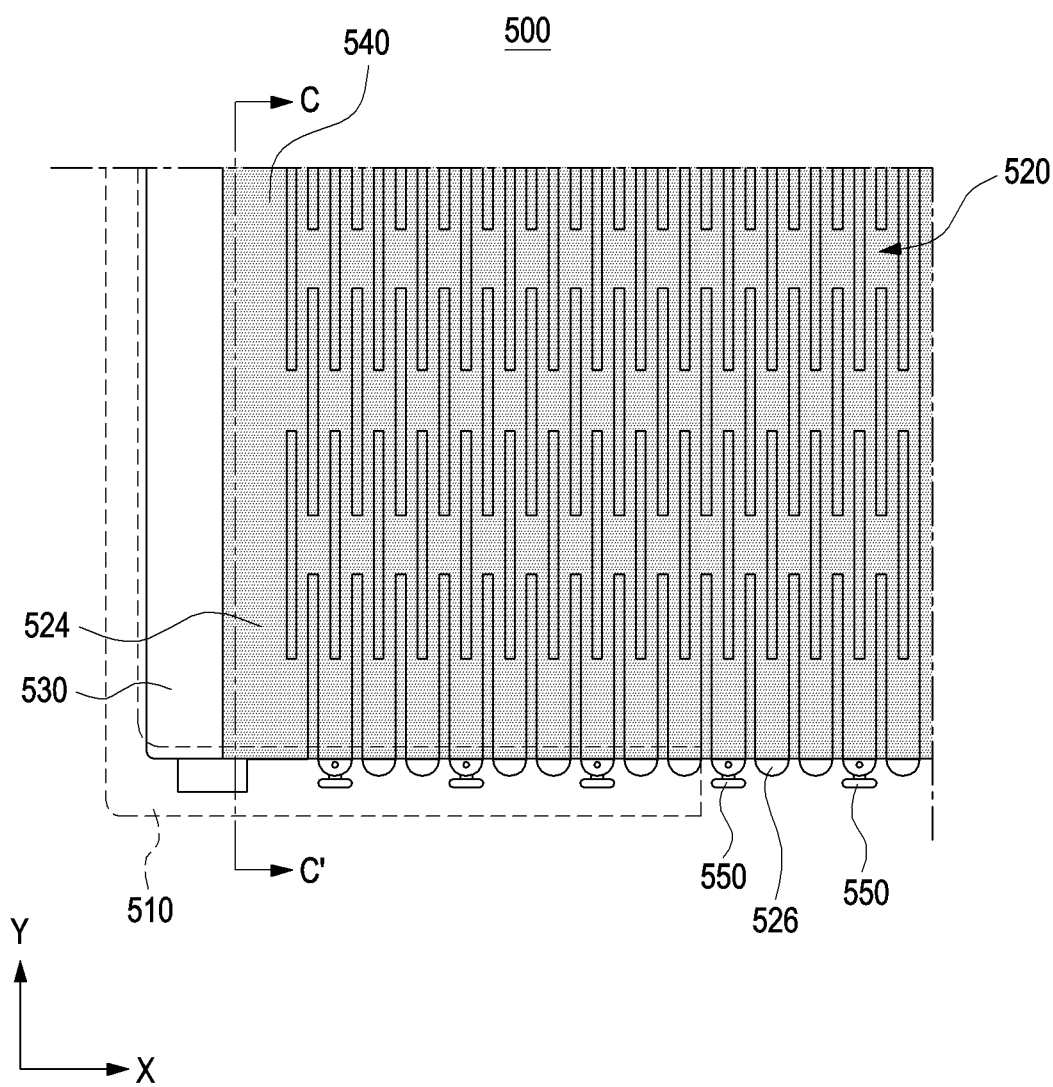
FIG. 16 is a front view of the electronic device including a wheel structure according to various embodiments of the disclosure.
Figure 17:
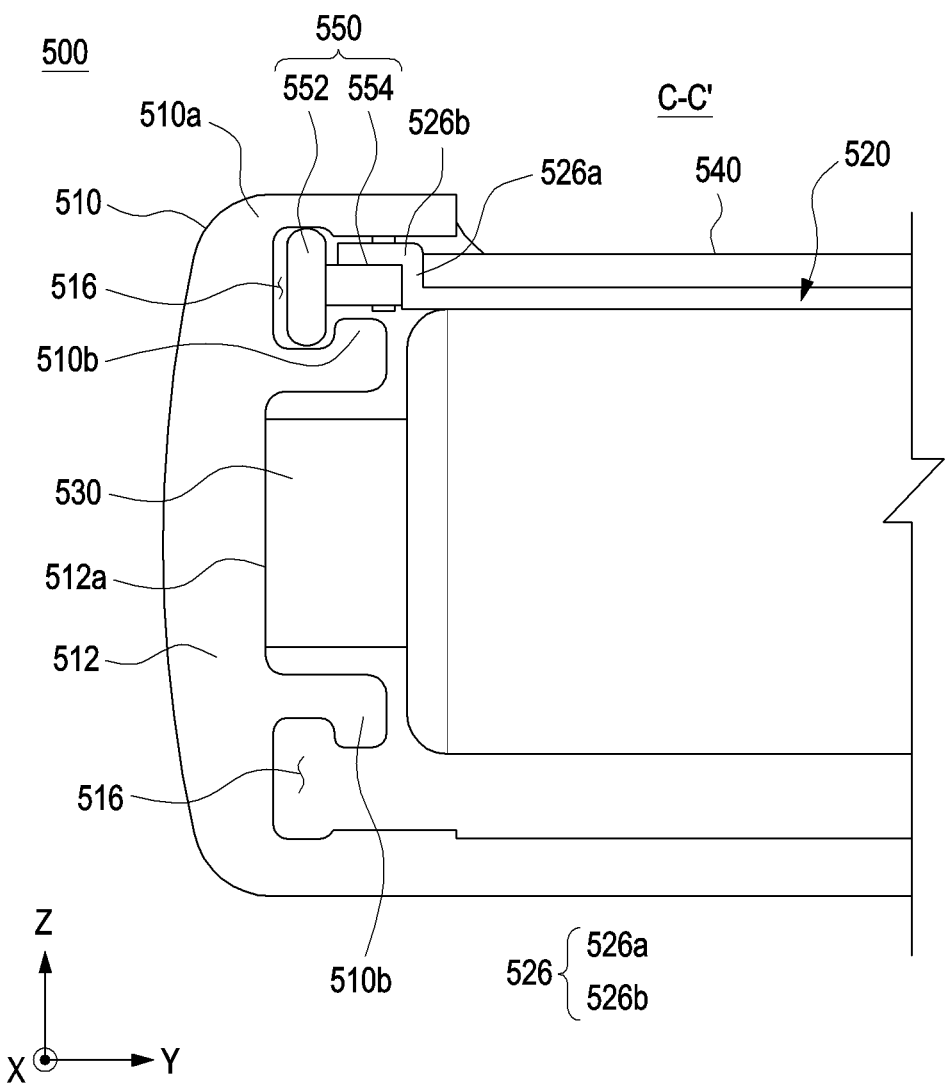
FIG. 17 is a cross-sectional view taken along line C-C' of FIG. 16.
Figure 18A:
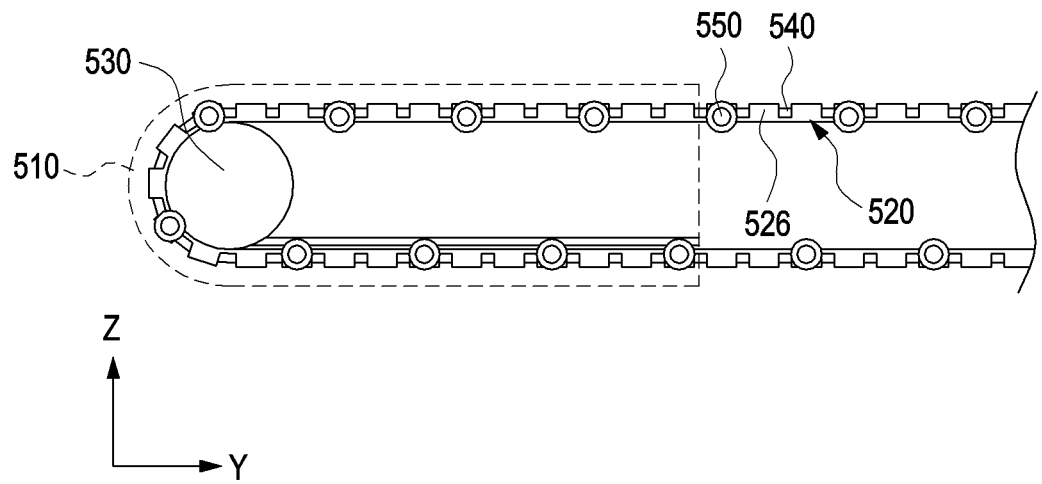
FIG. 18A is a side view of the electronic device including a wheel structure according to various embodiments of the disclosure in the closed state.
Figure 18B:
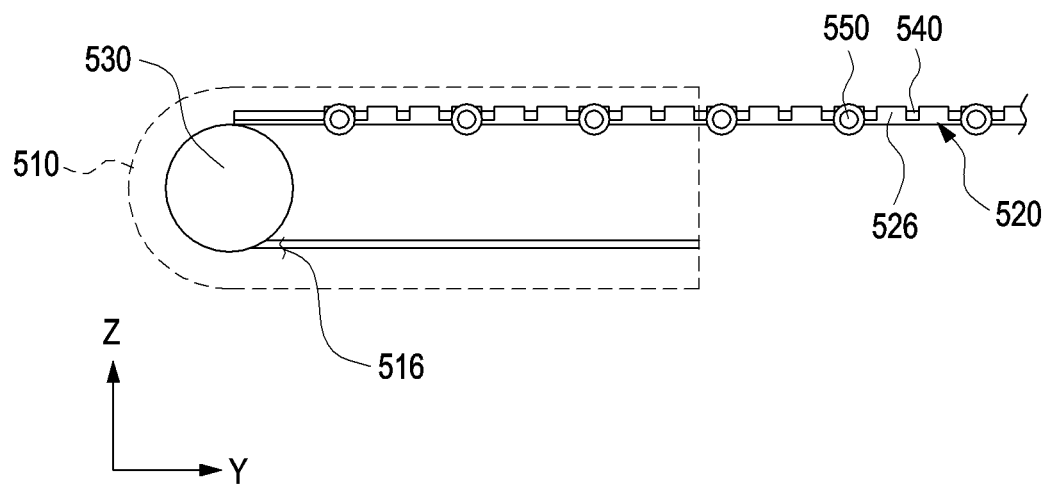
FIG. 18B is a side view of the electronic device including a wheel structure according to various embodiments of the disclosure in the opened state.

FIG. 15 is a perspective view of an electronic device including a wheel structure according to various embodiments of the disclosure. FIG. 16 is a front view of the electronic device including a wheel structure according to various embodiments of the disclosure. FIG. 17 is a cross-sectional view taken along line C-C' of FIG. 16. FIG. 18A is a side view of the electronic device including a wheel structure according to various embodiments of the disclosure in the closed state, and FIG. 18B is a side view of the electronic device including a wheel structure according to various embodiments of the disclosure in the opened state.

Referring to FIGS. 15, 16, 17, 18a and 18b, an electronic device 500 may include a second housing 510, a support member 520, a roller 530, and a display 540. The configurations of the electronic device 500, the second housing 510, the support member 520, the roller 530, and the display 540 of FIGS. 15, 16, 17, 18A, and 18B may be wholly or partly the same as those of the electronic device 200, the second housing 210, the support member 220, the roller 230, and the display 240 of FIGS. 4 to 7.

According to various embodiments, the second housing 510 may include a guide groove 516. According to an embodiment, the guide groove 516 may receive at least a portion of the support member 520 (e.g., the protrusion 526) and the wheel assembly 550. According to an embodiment, the guide groove 516 may be provided in the inner surface of the first edge 512 (e.g., the second side wall 123b or the third side wall 123c in FIG. 3), and may extend along a direction (e.g., the X-axis direction) in which the first housing (e.g., the first housing 101 in FIG. 1A) slides. For example, the guide groove 516 may be provided along at least a portion of the circumference of the first edge 512.

According to various embodiments, the second housing 510 may include a (2-3)$^{th}$ housing area 510a that covers at least a portion of the support member 520 (e.g., the protrusion 526) and a (2-4)$^{th}$ housing area 510b that surrounds at least a portion of the roller 530 and protrudes from the inner surface 512a of the second housing 510. According to an embodiment, the guide groove 516 may be located between the (2-3)$^{th}$ housing area 510a and the (2-4)$^{th}$ housing area 510b.

According to various embodiments, the support member 520 may include a moving portion 524 disposed under at least a portion of the display 540 and a protrusion 526 extending from the moving portion 524. According to an embodiment, the protrusion 526 may be inserted into the guide groove 516, and the support member 220 may slide along the guide groove 516.

According to various embodiments, at least a portion of the protrusion 526 may be bent. For example, the protrusion 526 may include a first area 526a protruding in a second direction (e.g., the Z-axis direction) perpendicular to the first direction (e.g., the X-axis direction), and a second area 526b extending from the first area 526a in a third direction (e.g., the Y-axis direction) perpendicular to the second direction d2.

According to various embodiments, the electronic device 500 may include a wheel assembly 550 connected to the support member 520. According to an embodiment, when at least a portion of the wheel assembly 550 rolls along the guide groove 516 and the support member 520 and/or the display 540 slide relative to the second housing 510, the generate frictional force may be reduced.

According to various embodiments, the wheel assembly 550 may include a wheel structure 552 configured to come into contact with the guide groove 516 of the second housing 510 and a wheel support member 554 connected to the protrusion 526. According to an embodiment, the wheel structure 552 may include a synthetic resin (e.g., polyurethane) or synthetic rubber.

According to various embodiments, the wheel assembly 550 may be disposed on the protrusion 526. For example, the wheel support member 554 may be disposed on the protrusion 526, and the wheel structure 552 may be rotatably mounted on the wheel support member 554. According to an embodiment, the wheel support member 554 may be mounted in the second area 526b of the protrusion 526. According to another embodiment, the wheel support member 554 may be mounted in the first area 526a and the second area 526b of the protrusion 526.

According to various embodiments of the disclosure, an electronic device (e.g., the electronic device 100 in FIG. 1A) may include a first housing (e.g., the first housing 101 in FIG. 1A), a second housing (e.g., the second housing 102 in FIG. 1A) configured to accommodate a portion of the first housing and including a guide groove (e.g., the guide groove 216 in FIG. 4) provided at a first edge (e.g., the first edge 212 in FIG. 4), a flexible display (e.g., the display 103 in FIG. 3) including a first display area (e.g., the first display area A1 in FIG. 2A) disposed on the first housing and a second display area (e.g., the second display area A2 in FIG. 2A) extending from the first display area, wherein the second display area is configured to move based on sliding of the first housing in a first direction (e.g., the X-axis direction in FIG. 4), and a support member (e.g., the support member 300 in FIG. 8A) including a fixed portion (e.g., the fixed portion 310 in FIG. 8A) disposed under the first display area, a moving portion (e.g., the moving portion 320 in FIG. 8B) disposed under the second display area, and at least one protrusion (e.g., the protrusion 226 in FIG. 7B). The at least one protrusion extends from the moving portion and is insertable into the guide groove. In this manner, the support member 300 can slide relative to the second housing 102 along the guide groove 216. The protrusion may include a first area (e.g., the first area 226a in FIG. 7B) protruding in a second direction (e.g., the second direction d2 in FIG. 7B) perpendicular to the first direction, and a second area (e.g., the second area 226b in FIG. 7B) extending from the first area in a third direction (e.g., the third direction d3 of FIG. 7B) different from the second direction.

According to various embodiments, a first angle (e.g., the first angle x1 in FIG. 7B) between the first area and the second area may be greater than 45 degrees and less than 90 degrees.

According to various embodiments, the electronic device may further include a roller (e.g., the roller 230 in FIG. 4) mounted on the first edge of the second housing and extending along a second edge (e.g., the second edge 214 in FIG. 4) perpendicular to the first edge, and the second display area and the moving portion may be configured to move in the first direction along the roller.

According to various embodiments, the moving portion may include at least one first through-pattern (e.g., the first through pattern 332 in FIG. 8B). At least a portion of the at least one first through-pattern is provided at a first border (e.g., the first border 322 in FIG. 8A) of the moving portion, and a first length (e.g., the first length l1 in FIG. 8B) of the at least one first through-pattern in the first direction may be shorter than a second length (e.g., the second length l2 in FIG. 8B) in a fifth direction (e.g., the Y-axis direction) perpendicular to the first direction or the second direction.

According to various embodiments, the fixed portion may include at least one second through-pattern (e.g., the second through-pattern 334 in FIG. 10A) and a border area (e.g., the border area 316 in FIG. 10A) surrounding the at least one second through-pattern.

According to various embodiments, the fixed portion, the moving portion, and the protrusion may be integrally configured.

According to various embodiments, the flexible display may include a front surface (e.g., the front surface 240a of FIG. 7A) exposed to the outside of the electronic device, and a portion of the first area of the protrusion may be located in the second direction with respect to the front surface.

According to various embodiments, the protrusion may surround at least a portion of the second display area of the flexible display.

According to various embodiments, the second housing may include a rear surface case (e.g., the rear surface case 121a in FIG. 3) facing the flexible display, a first side wall (e.g., the first side wall 123a in FIG. 3) extending from the rear surface case, a second side wall (e.g., the second side wall 123b in FIG. 3) extending from the rear surface case and perpendicular to the first side wall, and a third side wall (e.g., the third side wall 123c in FIG. 3) extending from the rear surface case and perpendicular to the first side wall and parallel to the second side wall. The guide groove may be provided in the second side wall and the third side wall.

According to various embodiments, the guide groove may include a first guide groove (e.g., the first guide groove 216a in FIG. 7A) configured to accommodate at least a portion of the moving portion and at least a portion of the first region, and a second guide groove (e.g., the second guide groove 216b in FIG. 7A) extending from the first guide groove and configured to accommodate at least a portion of the second area.

According to various embodiments, the electronic device may further include at least one first magnet (e.g., the first magnet 452 in FIG. 14A) disposed adjacent to the guide groove, and at least one second magnet (e.g., the second magnet 454 in FIG. 14A) disposed on the protrusion and configured to provide a repulsive force to the at least one first magnet.

According to various embodiments, the protrusion may include a third area (e.g., the third area 426c in FIG. 13) extending from the second area in a fourth direction (e.g., the −Z direction in FIG. 13) opposite to the second direction.

According to various embodiments, the electronic device may further include a first roller (e.g., the first roller 432 in FIG. 11) including a roller wheel (e.g., the first roller wheel 432a in FIG. 11) mounted on the first edge of the second housing, and a bar structure (e.g., the bar structure 432b in FIG. 11) extending along a second edge (e.g., the second edge 414 in FIG. 12) perpendicular to the first edge, and at least one second roller (e.g., the second roller 434 in FIG. 12) including a second roller wheel 434a (e.g., the second roller wheel 434a in FIG. 11) mounted on the first edge and spaced apart from the first roller wheel in the first direction. The protrusion may be configured to face at least one of the first roller wheel and the second roller wheel.

According to various embodiments, the electronic device may further include at least one wheel assembly (e.g., the wheel assembly 550 in FIG. 15) connected to the protrusion and accommodated in the guide groove.

According to various embodiments, the second area may be perpendicular to the first area, and the wheel assembly may include a wheel support member (e.g., the wheel support member 554 in FIG. 17) disposed under the second area and a wheel structure (e.g., the wheel structure 552 of FIG. 17) rotatably mounted to the wheel support member.

According to various embodiments of the disclosure, a display assembly (e.g., the display assembly 130 in FIG. 3) may include a flexible display (e.g., the display 103 in FIG. 3) including a first display area (e.g., the first display area A1 in FIG. 3) and a second display area (e.g., the second display area A2 in FIG. 3) extending from the first display area in a first direction (e.g., the X-axis direction in FIG. 6), and a support member (e.g., the support member 300 in FIG. 8A) including a fixed portion (e.g., the fixed portion 310 of FIG. 8A) disposed under the first display area, a moving portion (e.g., the moving portion 320 in FIG. 8B) disposed under the second display area and integrally configured with the fixed portion, and at least one protrusion (e.g., the guide groove 216 in FIG. 7B) extending from the moving portion. The moving portion may include at least one first through-pattern (e.g., the first through pattern 332 in FIG. 8B). At least a portion of the at least one first through-pattern is located at a border (e.g., the first border 322 in FIG. 8B) of the moving portion, and the protrusion may include a first area (e.g., the first area 226a in FIG. 7B) extending in a second direction (e.g., the Y-axis direction or the second direction d2 in FIG. 7B) perpendicular to the first direction, and a second area (e.g., the second area 226b in FIG. 7B) extending from the first area in a third direction (e.g., the third direction d3 of FIG. 7B) different from the second direction.

It may be apparent to a person ordinarily skilled in the technical field to which the disclosure belongs that the electronic device of the disclosure including the above-described display assembly and support member is not limited by the above-described embodiments and drawings, and can be variously substituted, modified, and changed within the technical scope of the disclosure.

The invention claimed is:
1. An electronic device comprising:
a first housing;
a second housing configured to accommodate at least a portion of the first housing, the second housing comprising a guide groove provided at a first edge;
a flexible display comprising a first display area disposed on the first housing and a second display area extending from the first display area, wherein the second display area is configured to move based on sliding of the first housing in a first direction; and a support member comprising a fixed portion disposed under the first display area, a moving portion disposed under the second display area, and at least one protrusion extending from the moving portion, the at least one protrusion insertable into the guide groove such that the support member slides relative to the second housing along the guide groove, wherein the protrusion comprises a first area protruding in a second direction perpendicular to the first direction and a second area extending from the first area in a third direction different from the second direction, the third direction extending at a first angle between the first area and the second area that is greater than 45 degrees and less than 90 degrees;

wherein the second area of the protrusion has a curved surface which is configured to contact with the guide groove.

2. The electronic device of claim 1, further comprising a roller mounted on the first edge of the second housing and extending along a second edge perpendicular to the first edge, wherein the second display area and the moving portion are configured to move along the roller in the first direction.

3. The electronic device of claim 1, wherein the moving portion comprises at least one first through-pattern, wherein at least a portion of the at least one first through-pattern is provided at a first border of the moving portion, and a first length of the at least one first through-pattern in the first direction is shorter than a second length in a fifth direction perpendicular to the first direction or the second direction.

4. The electronic device of claim 3, wherein the fixed portion comprises at least one second through-pattern and a border area surrounding the at least one second through-pattern.

5. The electronic device of claim 1, wherein the fixed portion, the moving portion, and the protrusion are integrally configured.

6. The electronic device of claim 1, wherein the flexible display comprises a front surface exposed to an outside of the electronic device, and a portion of the first area of the protrusion is located in the second direction with respect to the front surface.

7. The electronic device of claim 1, wherein the protrusion surrounds at least a portion of a side surface of the second display area of the flexible display.

8. The electronic device of claim 1, wherein the second housing comprises:
a rear surface case facing the flexible display;
a first side wall extending from the rear surface case;
a second side wall extending from the rear surface case and perpendicular to the first side wall; and
a third side wall extending from the rear surface case and perpendicular to the first side wall and parallel to the second side wall, and
wherein the guide groove is provided in the second side wall and the third side wall.

9. The electronic device of claim 8, wherein the guide groove comprises:
a first guide groove configured to accommodate at least a portion of the moving portion and at least a portion of the first area; and
a second guide groove extending from the first guide groove and configured to accommodate at least a portion of the second area.

10. The electronic device of claim 1, further comprising:
at least one first magnet disposed adjacent to the guide groove; and
at least one second magnet disposed on the protrusion and configured to provide a repulsive force to the at least one first magnet.

11. The electronic device of claim 10, wherein the protrusion comprises a third area extending from the second area in a fourth direction opposite to the second direction.

12. The electronic device of claim 10, further comprising:
a first roller comprising a first roller wheel mounted on the first edge of the second housing, and a bar structure extending along a second edge perpendicular to the first edge; and
at least one second roller mounted on the first edge and comprising a second roller wheel spaced apart from the first roller wheel in the first direction,
wherein the protrusion is configured to face at least one of the first roller wheel or the second roller wheel.

13. The electronic device of claim 1, further comprising at least one wheel assembly connected to the protrusion and accommodated in the guide groove.

14. The electronic device of claim 13, wherein the second area is perpendicular to the first area, and
the wheel assembly comprises a wheel support member disposed under the second area and a wheel structure rotatably mounted on the wheel support member.

15. An electronic device comprising:
a first housing;
a second housing configured to accommodate at least a portion of the first housing, the second housing comprising a guide groove provided at a first edge;
a flexible display comprising a first display area disposed on the first housing and a second display area extending from the first display area, wherein the second display area is configured to move based on sliding of the first housing in a first direction;
a support member comprising a fixed portion disposed under the first display area, a moving portion disposed under the second display area, and at least one protrusion extending from the moving portion, the at least one protrusion insertable into the guide groove such that the support member slides relative to the second housing along the guide groove;
at least one first magnet disposed adjacent to the guide groove; and
at least one second magnet disposed on the protrusion and configured to provide a repulsive force to the at least one first magnet;
wherein the protrusion comprises a first area protruding in a second direction perpendicular to the first direction and a second area extending from the first area in a third direction different from the second direction.

16. An electronic device comprising:
a first housing;
a second housing configured to accommodate at least a portion of the first housing, the second housing comprising a guide groove provided at a first edge;
a flexible display comprising a first display area disposed on the first housing and a second display area extending from the first display area, wherein the second display area is configured to move based on sliding of the first housing in a first direction;
a support member comprising a fixed portion disposed under the first display area, a moving portion disposed under the second display area, and at least one protrusion extending from the moving portion, the at least one protrusion insertable into the guide groove such that the support member slides relative to the second housing along the guide groove; and at least one wheel assembly connected to the protrusion and accommodated in the guide groove;

wherein the protrusion comprises a first area protruding in a second direction perpendicular to the first direction and a second area extending from the first area in a third direction different from the second direction.

\* \* \* \* \*